United States Patent
Pea et al.

(10) Patent No.: US 8,972,861 B2
(45) Date of Patent: Mar. 3, 2015

(54) INTERACTIVE POINT-OF-VIEW AUTHORING OF DIGITAL VIDEO CONTENT USING A RESIZABLE OVERLAY WINDOW AND A CYLINDRICAL LAYOUT

(75) Inventors: Roy D. Pea, Stanford, CA (US); Michael I. Mills, Redwood City, CA (US); Joseph H. Rosen, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1163 days.

(21) Appl. No.: 12/911,533

(22) Filed: Oct. 25, 2010

(65) Prior Publication Data

US 2011/0096144 A1 Apr. 28, 2011

Related U.S. Application Data

(63) Continuation of application No. 10/334,162, filed on Dec. 30, 2002, now Pat. No. 7,823,058.

(51) Int. Cl.
*G06F 3/00* (2006.01)
*H04N 5/232* (2006.01)
*H04N 5/262* (2006.01)

(52) U.S. Cl.
CPC ........... *H04N 5/23238* (2013.01); *H04N 5/262* (2013.01)
USPC ............................ 715/720; 715/230; 715/719

(58) Field of Classification Search
None
See application file for complete search history.

(56) References Cited

U.S. PATENT DOCUMENTS 5,600,775 A 2/1997 King et al.
5,717,468 A 2/1998 Baryla
(Continued)

FOREIGN PATENT DOCUMENTS

EP 1 087 618 3/2001

OTHER PUBLICATIONS

Arman, et al., "Image Processing on Encoded Video Sequences", Proc. First ACM International Conference on Multimedia, 1994.
(Continued)

*Primary Examiner* — Stephen Hong
*Assistant Examiner* — Asher Kells

(57) ABSTRACT

The present invention provides electronic methods and apparatus for interactively authoring, sharing and analyzing digital video content. Methods for authoring include displaying visual data, defining each traversal as a time-based sequence of frames and annotating and storing a record of the traversal and its associated audio records. Defining the traversal Includes interactively panning the visual data by positioning an overlay window relative to the visual data and zooming in or out by resizing the overlay window. In alternative embodiments, the visual data may be displayed in a rectangular layout or a cylindrical layout. The methods are practiced using an integrated graphical interface, including an overview region displaying the visual data, a detail region displaying current data within the overlay window, and a worksheet region displaying a list of previously stored annotated traversal records. In a further aspect, the worksheet region list of annotated traversal records is published in a web document accessible via network using a standard HTML browser, and further annotations may be added by a community of network users. Analytical methods are also provided in which data markers corresponding to traversal records are plotted against an interactive abstract map enabling users to shift between levels of abstraction in exploring the video record.

19 Claims, 14 Drawing Sheets

(56) References Cited

U.S. PATENT DOCUMENTS

| | | | |
|---|---|---|---|
| 5,760,785 | A | 6/1998 | Barber et al. |
| 5,850,352 | A | 12/1998 | Moezzi et al. |
| 5,920,317 | A | 7/1999 | McDonald |
| 6,006,241 | A | 12/1999 | Purnaveja et al. |
| 6,028,584 | A | 2/2000 | Chiang et al. |
| 6,085,226 | A | 7/2000 | Horvitz |
| 6,121,966 | A | 9/2000 | Teodosio et al. |
| 6,226,655 | B1 | 5/2001 | Borman et al. |
| 6,243,091 | B1 | 6/2001 | Bertis |
| 6,262,724 | B1 | 7/2001 | Crow et al. |
| 6,285,365 | B1 | 9/2001 | Nalwa |
| 6,337,708 | B1 | 1/2002 | Furlan et al. |
| 6,369,818 | B1 | 4/2002 | Hoffman et al. |
| 6,400,378 | B1 | 6/2002 | Snook |
| 6,449,653 | B2 | 9/2002 | Klemets et al. |
| 6,624,846 | B1 | 9/2003 | Lassiter |
| 7,480,864 | B2 | 1/2009 | Brook et al. |
| 7,559,017 | B2 | 7/2009 | Datar et al. |
| 2002/0075282 | A1 | 6/2002 | Vetterli et al. |
| 2002/0194197 | A1 | 12/2002 | Flank |
| 2004/0148563 | A1 | 7/2004 | Lord et al. |
| 2007/0030245 | A1 | 2/2007 | Ngari et al. |
| 2008/0106594 | A1 | 5/2008 | Thrun |
| 2008/0292213 | A1 | 11/2008 | Chau |
| 2009/0031246 | A1 | 1/2009 | Cowtan et al. |
| 2009/0041379 | A1 | 2/2009 | Shih |

OTHER PUBLICATIONS

Chang, et al., "A Wavelet Approach to Foveating Images," Proc. 13.sup.th ACM Symposium on Computational Geometry, pp. 397-399, 1997.

Chang, et al., "Realtime Visualization of Large Images over a Thinwire," IEEE Visualization '97 (Late Breaking Hot Topics), pp. 45-48, 1997. See CD proceedings of conference. Paper from ftp://cs.nyu.edu/pub/local/yap/visual/thinwire.ps.gz.

Chen et al., "Video VR: A Real-Time System for Automatically Constructing Panoramic Images from Video Clips," Taiwan University Communications and Multimedia Lab Technical Report, 1999.

Chen, S., "QuickTime.RTM. VR—An Image-Based Approach to Virtual Environment Navigation," Proc. Of ACM SIGGRAPH' 95, pp. 29-38, Aug. 1995.

Digital Fountain Corporation ,"Digital Fountain's Meta-Content. TM. Technology, A Quantum Leap in Content Delivery" (2002), Technology White Paper, Apr. 23, 2002.

Foote, et al., "FlyCam: Practical Panoramic Video and Automatic Camera Control," Proc. IEEE International Conference on Multimedia and Expo, vol. III, pp. 1419-1422, Aug. 2000.

Foster, et al., "The Anatomy of the Grid: Enabling Scalable Virtual Organizations," International J. Supercomputer Application, 15(3), 2001.

"FullView.RTM., Why Settle for Less.RTM." Gallery, www.fullview.com/gallery.html, Date Unknown, printed Nov. 7, 2002.

IPIX, Internet Pictures Corporation FAQ, www.ipix.com/help/viewalways.sub.--java3.sub.--2/index.html, Date Unknown, Printed Nov. 7, 2002.

Kimber, et al., "FlyAbout: Spatially Indexed Panoramic Video," Technical Report, 2001.

"NBC Sports brings innovative video technology to 2001 NBA Finals TOTALVIEQ.TM. from Be Here Corporation," New press release, Jun. 4, 2001; printed Nov. 5, 2002, www.behere.com.

Roschelle, et al., "Videonoter: A Tool for Exploratory Video Analysis," IRL Report No. IRL90-0021, Mar. 1990.

Rui, et al., "Viewing Meetings Captured by an Omni-Directional Camera," Technical Report, MSR-TR-2000-97, Sep. 21, 2000.

Rutledge, et al., "Building Federated Systems with Relational Connect and Database Views," IBM e-business Solution Integration Technical White Paper, 2001.

Smith, et al, "A New Family of Algorithms for Manipulating Compressed Images," IEEE Computer Graphics and Applications, Sep. 1993, 13(5), 34-42.

Vichare, et al., "Content Cashing Vendor Market Share", 2001, IDC Bulletin No. 26785, Mar. 2002.

International Search Report dated Jun. 8, 2004 for corresponding PCT Application No. PCT/US03/40847.

International Search Report dated Sep. 24, 2004 for corresponding PCT application, PCT/US03/40841.

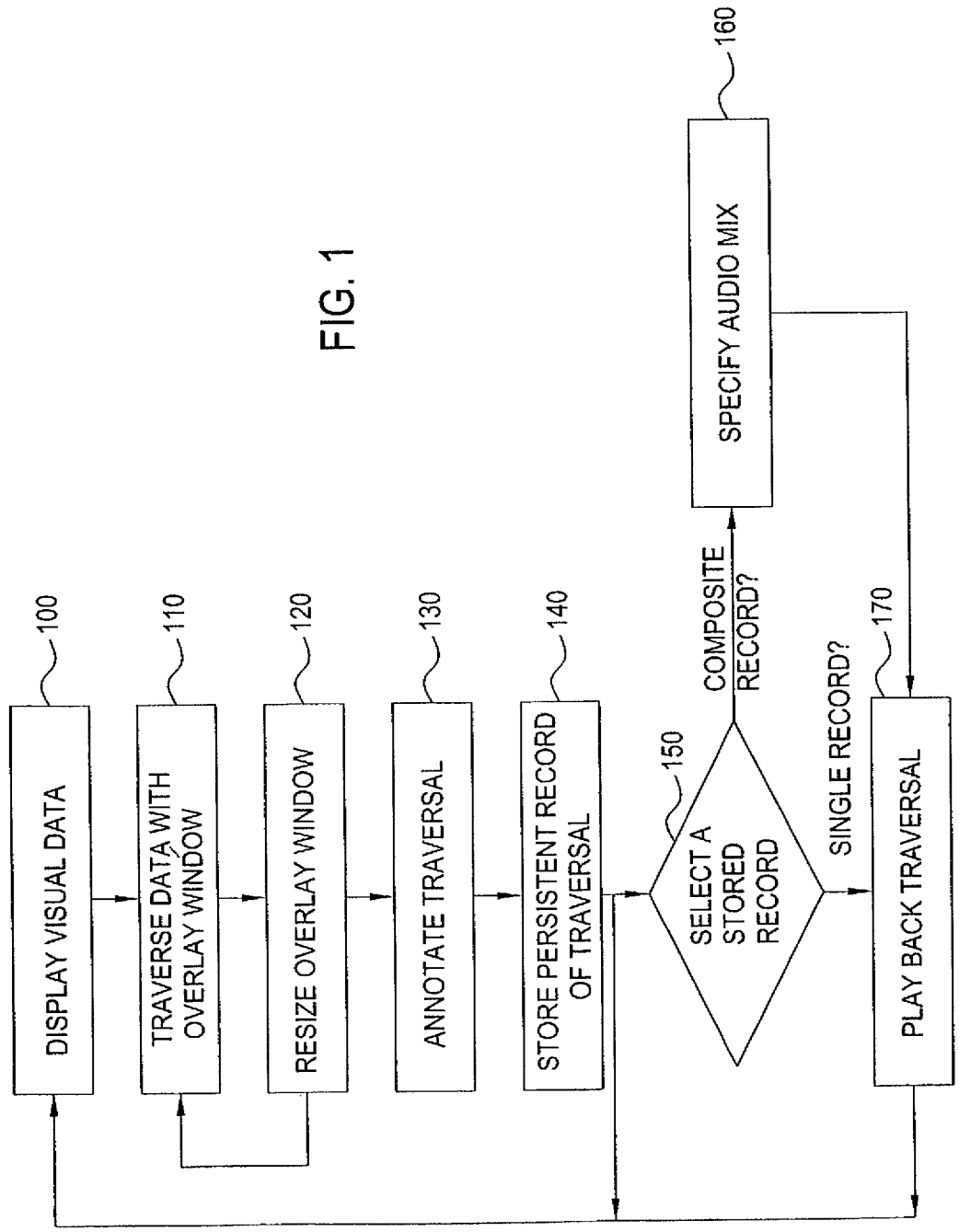

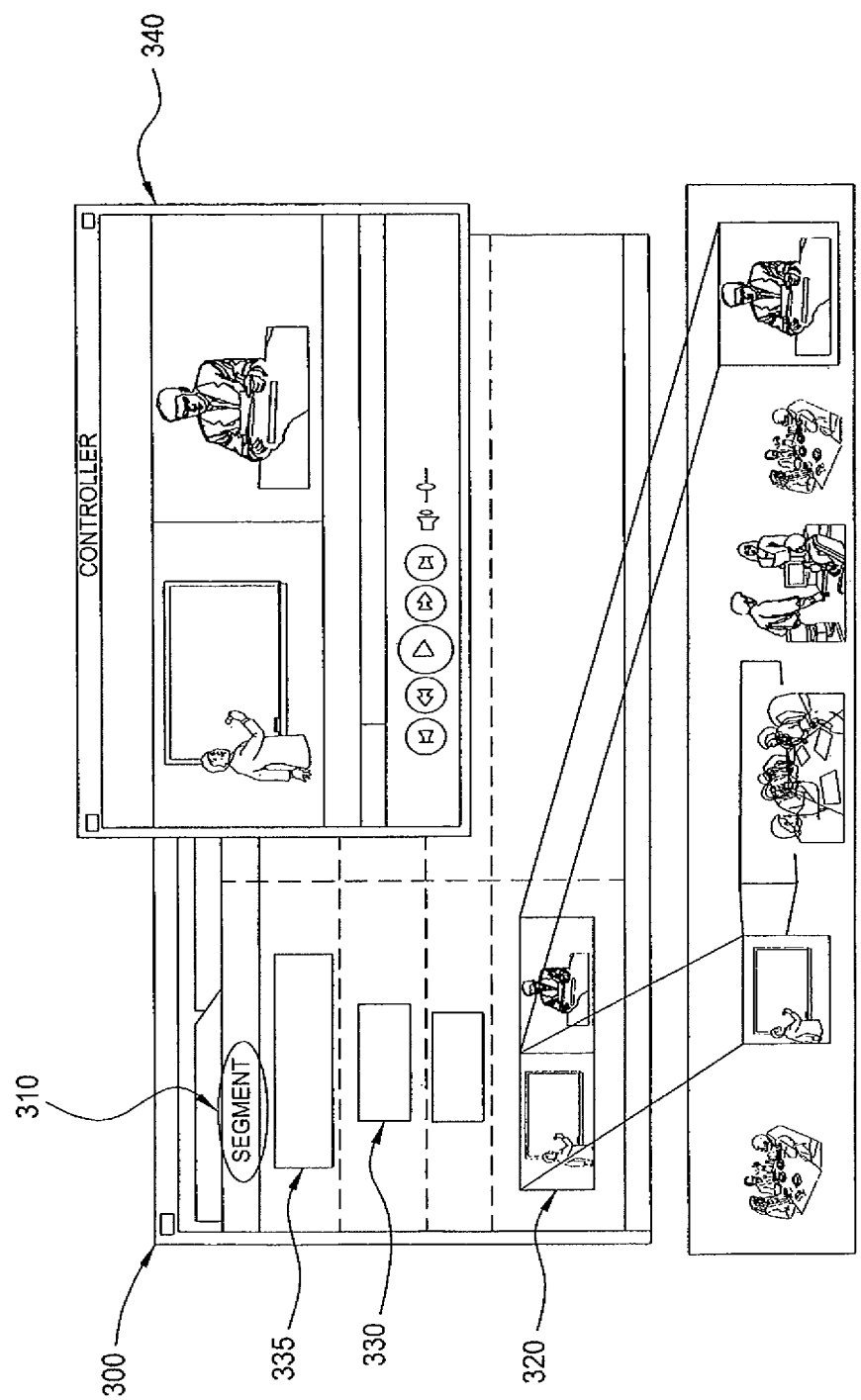

INTERACTIVE POINT-OF-VIEW AUTHORING OF DIGITAL VIDEO CONTENT USING A RESIZABLE OVERLAY WINDOW AND A CYLINDRICAL LAYOUT

This application is a continuation of the U.S. patent application Ser. No. 10/334,162, filed on Dec. 30, 2002, now U.S. Pat. No. 7,823,058 which is currently allowed and is incorporated herein by reference in its entirety.

FIELD OF INVENTION

This invention relates to electronic methods and systems for interactive authoring, sharing and analysis of digital video content.

BACKGROUND ART

Various systems have been described and designed for capture and interactive navigation of panoramic digital imagery. For example, see "FlyCam: Practical Panoramic Video," Proceedings of IEEE International Conference on Multimedia and Expo, vol. III, pp. 1419-1422 (August 2000); U.S. Pat. No. 6,285,365, "Icon-Referenced Panoramic Image Display," Nalwa; and U.S. Pat. No. 6,121,966, "Navigable Viewing System," Teodosio et al.

Separately, systems also exist for annotating and sharing traditional video "clips" or excerpts. See, e.g., "VideoNoter: A Tool for Exploratory Video Analysis," Roschelle, Pea, & Trigg, Institute for Research on Learning, Technical Report No. 17 (1990).

However, little attention has so far been paid to the larger need—and opportunity—of co-located or distributed user communities to author and share personal interpretations of multimedia content by creating, annotating, storing, and sharing persistent records of "point-of-view" visual media traversals. Such records should faithfully capture the author's unique perspective in viewing particular media content— e.g., recording the spatial focus and timing of the author's viewing experience—as well as provide a vehicle for the author to express his or her interpretation of that media content through comments, categorizations, and other symbolic forms of annotations. An effective solution addressing this need should provide well-integrated, interactive facilities enabling powerful expression but yet suitable for authors who are not technology specialists. In addition, the solution should enable authors to share their interpretations with a networked user community, and likewise enable community participants to voice their own comments and views in response to specific media content. Furthermore, the desired solution should support analytical tools enabling users to explore and quantify the significance of media content and commentary being shared.

SUMMARY OF THE INVENTION

Briefly, the present invention provides electronic methods and apparatus for interactive authoring, sharing and analysis of digital video content.

In one aspect, the present invention provides an interactive, electronic method of authoring annotated traversals by displaying visual data, defining each traversal as a time-based sequence of frames, and annotating and storing a record of the traversal. When performed repeatedly the method creates a plurality of stored traversals, potentially from different visual sources. The visual data preferably includes motion video, still, simulated/animated, panoramic and/or live imagery. The panoramic imagery preferably includes imagery captured using a plurality of cameras facing outward from a fixed point (or inward from a perimeter), such that traversals can reflect a user-adjustable 3D perspective. The annotations preferably include textual comments, graphical symbols, classification codes, metadata and/or audio transcription. The classification codes are interactively selected from user-definable code templates. In a further aspect, the stored traversal record may encode the traversed visual data in the form of compressed image data, or as a set of location coordinates defining the traversal.

Defining the traversal preferably comprises interactively panning the data by positioning an overlay window relative to the visual data, and zooming in or out by resizing the overlay window, and storing a record of the traversal. The visual data may be displayed in a rectangular layout; or, alternatively, in a cylindrical layout, wherein the position of the overlay is defined by a virtual camera centrally located in the cylinder. Further, positioning the overlay window may comprise moving the visual data while the overlay window is held fixed; or, alternatively, moving the overlay window while the visual data is held fixed. The overlay window has a geometric shape that is preferably user-selectable. Further aspects of the invention include concurrently panning the visual data with a plurality of independently-positioned overlay windows.

In a further aspect of the present invention, the method is preferably practiced using an integrated graphical interface. The graphical user interface preferably comprises a plurality of computer display regions, including an overview region displaying the visual data, a detail region displaying current data within the overlay window and a worksheet region displaying a list of the plurality of stored annotated traversal records. The detail region displays data at a higher magnification or resolution than the overview region. Such magnification or resolution may be controlled by either the user or enabled by web services that are responsive to user bandwidth connectivity or other performance-relevant metrics. Playback of a selected stored record in the detail region is initiated by interactively selecting one of the traversal records, such as by dragging and dropping a graphical element corresponding to the selected record from the worksheet onto the detail region. Further aspects of the invention include specifying a compound traversal record, being a combination of a plurality of the stored traversal records. Playing back the compound traversal record includes adjacently displaying the contents of the combined traversal records. The audio contribution from the combined traversal records may be specified by selecting one source record, turning off all audio, and/or specifying a relative audio contribution for each record. In a further aspect, the worksheet region list of annotated traversal records is published in a document accessible via network using a standard HTML browser.

In one embodiment, the present invention is practiced using a remotely controlled digital electronic apparatus for interactively authoring annotated traversals through visual data. The apparatus includes a first display device for displaying visual data, and a handheld remote control device, in communication with the first device. The remote controller is configured to control a graphical interaction defining a traversal of the displayed visual data, and annotating and storing a time-based record of the annotated traversal. Defining the traversal includes panning the visual data by positioning an overlay window relative to the displayed visual data, and zooming by resizing the overlay window.

The present Invention further provides an interactive, electronic method of authoring traversals through visual data and associated spatial audio data. The method includes displaying the visual data, interactively defining a traversal of the data—a time-based sequence of frames, each comprising a spatial subset of the visual data—and storing a record of the traversal, including the spatial audio data associated with the visual data in each frame. The visual data and audio data preferably include an audiovisual recording of a scene. The visual data may also comprise a depiction of a location, and the audio data a recording of sound from the location. For example, visual data may depict a concert hall or conference room, and the spatial audio may comprise a recording of music in the concert hall or conversation in the conference room. A further aspect comprises annotating the traversal record with a transcription of the spatial audio data included in the record.

In a further embodiment, the present invention provides a system and method for sharing user perspectives on visual data by publishing, preferably as a web page, a listing of traversal records and annotations. The web page, published on the Internet or a private intranet, preferably provides a region for displaying selected traversals. Users who browse or access the published page can interactively select traversals for play back, and interactively add annotations to the page for others to view. Each annotation can be coded (e.g., by color or shading, as well as by name) to indicate its author. In a further feature, the listed traversal records include at least one compound traversal record (specifying a combination of traversals); in accordance with this feature, play back preferably comprises adjacently playing back the contents of the corresponding plurality of traversals, either in side by side panes or in a window-within-window format. In yet a further feature, an index of the annotations is also published, being searchable via a web browser. Such an index may provide thumbnail images or dynamic image representations serving as proxies for the annotated media item. This feature allows retrieval and access of a web page listing those traversal records associated with the annotations specified in the search.

In a further aspect, the present invention provides a method for interactive, electronic exploration and analysis of visual data using a plurality of traversal records. The method comprises displaying an abstract map; plotting a plurality of markers—each corresponding to a traversal record—in a corresponding plurality of locations on the map; and playing back the traversal in response to selection of the marker. The abstract map may, for example, represent an outline of a scene from the visual data, automatically generated using an edge detection algorithm, in which case the markers might logically be plotted based upon the spatial location of the imagery captured in each corresponding traversal record. Alternatively, the abstract map may represent a graph whose axes measure one or more annotation data values specified for the stored records, in which case the markers might logically be plotted based upon the particular annotation values specified for each corresponding traversal record. In yet a further aspect of the invention, the method is performed using a graphical user interface, including a worksheet region with a list of traversal records and associated annotations. In this aspect, the method further contemplates interactively selecting a spatial area within the abstract map (such as by means of a slider bar), and in response displaying within the worksheet a filtered list of traversal records corresponding to those markers located within the spatial area of interest.

BRIEF DESCRIPTION OF THE DRAWINGS

FIG. 1 is a flow diagram illustrating a method for authoring annotated, "point-of-view" traversals of visual data in accordance with a preferred embodiment of the present invention.

FIG. 3 illustrates a graphical user interface for viewing compound traversal, records.

DETAILED DESCRIPTION OF PREFERRED EMBODIMENT

Preferred embodiments of the present invention will now be described in detail, with reference to the drawings. For present purposes, visual data generally includes any manner of digital image data, including motion video, still imagery, simulated or animated imagery, panoramic imagery, and live imagery, all with or without an accompanying audio channel.

A. Authoring

Figure 2A:
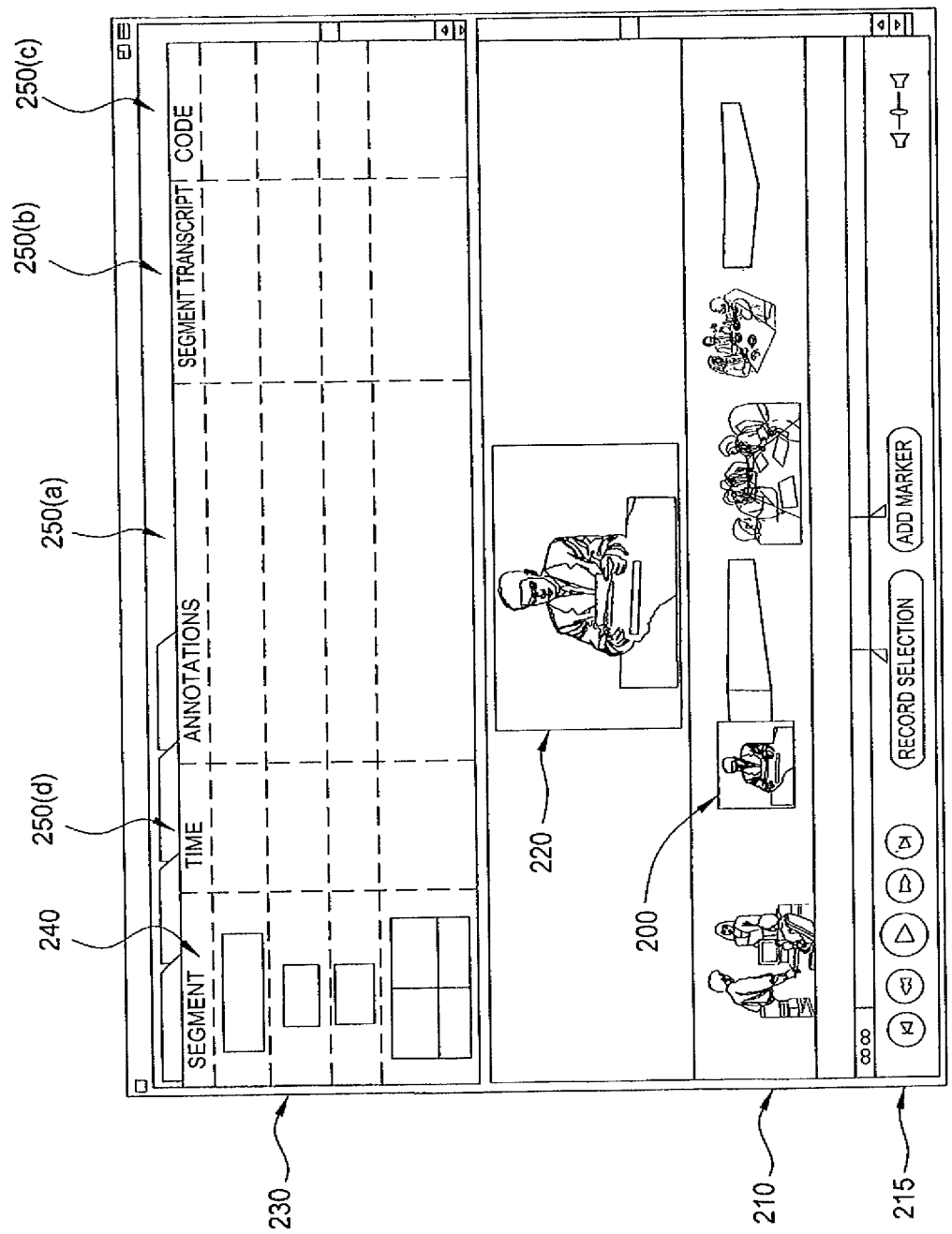
FIG. 2A illustrates a graphical user interface for defining point-of-view traversals in accordance with a rectangular embodiment.

FIG. 1 is a flow diagram illustrating a method for authoring annotated, "point-of-view" traversals of visual data in accordance with a preferred embodiment of the present invention. FIG. 2A illustrates a graphical user interface for defining point-of-view traversals in accordance with a rectangular embodiment. Broadly, the authoring process consists of interactively selecting from the visual data a set of cropped space and time selections, and marking these in the workspace. We refer to this interactive selection herein as traversal.

At 100, visual data is displayed in overview window 210, providing an overview of the entire scene. Overview 210 may be associated with a standard video stream, still image, or animation, or may utilize a panoramic 360-degree representation of a video scene: For linear video, the overview 210 would show a standard 4:3 aspect ratio video stream created from the original video recording, where a rectangular overlay 200 on the scene corresponds to the cropped spatial region of view of a virtual camera looking at that particular scene region. For panoramic video as depicted, the overview 210 (also called a "panoramic overview") shows a peeled back image created from the original cylindrical video recording. Rectangular overlay 200 on the panorama corresponds to the field of view of a virtual camera looking at that particular scene region. In either case, detail window 220 preferably provides the "camera view"—a higher resolution image defined by the boundaries of the rectangular overlay 200 within overview 210. Such higher resolution preferably may be adjusted by the user, or may be enabled and adjusted by web services responsive to user bandwidth connectivity and/or other performance-relevant metrics. Workspace 230 provides a flexible environment for annotating and organizing the video and audio traversals culled from the scene, as will be discussed further below.

At 110, overlay window 200 is interactively positioned on a designated spatial subset of the visual data displayed in window 210. At 120, overlay window is interactively resized by the user, to "zoom" in or out on the selected visual data. Tasks 110 and 120 are performed repeatedly over time as desired by the user, while the visual data of 100 is continuously displayed. The user thereby traverses a desired spatial and temporal subset of the visual data. For example, if the visual data includes video data, the user in effect creates a "movie within a movie'> by positioning and sizing the overlay window to 200 with respect to content of particular interest within each current video frame. We occasionally refer herein to definition of such traversals as "point of view" authoring, because the author/user's unique and individual visual perspective on the visual data is reflected in each traversal.

In the case of panoramic visual data, creating effective interfaces for navigation presents challenges and opportunities for computer imaging and user interface design. On the one hand, omni-directional cameras can provide a user with a 360-degree representation of the entire real-world space (from a single nodal point). On the other hand, the optics used to create the panoramic overview introduce projective distortions (warping) in the image that limit its usefulness as an informational image (see, e.g., Foote & Kimber 2000), especially where the user needs to extract accurate information about the spatial layout and the locations and body orientations of people" in the scene. Consider, for example, the difficulty of answering the following questions with reference to a panoramic overview: What is its spatial layout of the scene? Which direction is forward and aft? Left and Right? How far away are the actors from each other? On the other hand, there may be other kinds of tasks for which the spatial distortions in the overview will not be an obstacle to information extraction. For example, a panoramic overview most likely would allow the user to answer questions such as: Who said what? When did they say it? How were they when they said it (information about nonverbal gestures, facial expressions, body positions, vocal intonation)? Interestingly, it may be that current methods of generating panoramic overviews are so spatially disorienting, that people find them distracting whether or not the task involves extracting spatially accurate information.

Figure 2B:
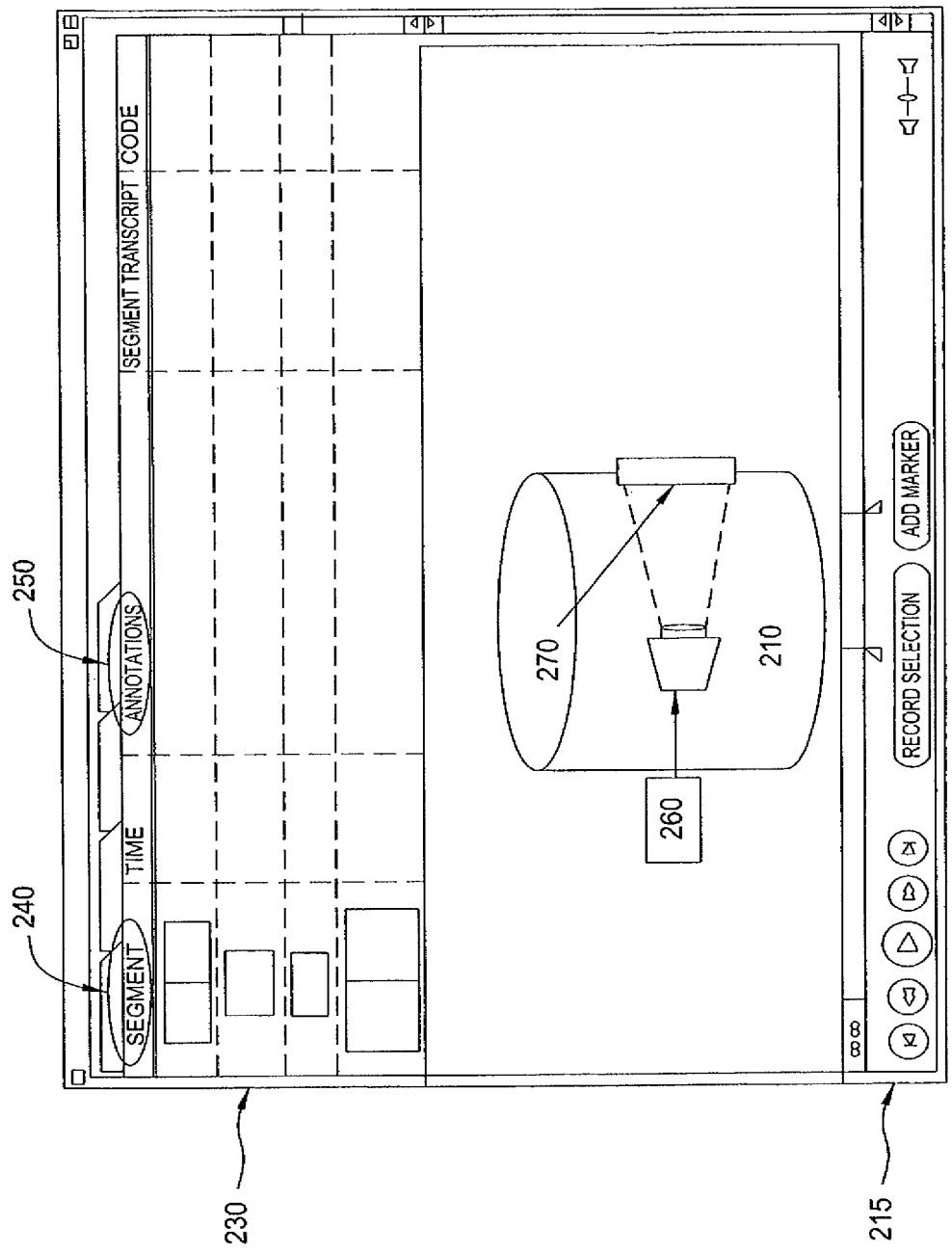
FIG. 2B illustrates a graphical user interface for defining point-of-view traversals in accordance with a cylindrical embodiment.

With the concerns of spatial orientation in mind, FIG. 2B illustrates an alternative embodiment with particular value for viewing and traversing panoramic data in accordance with the present invention. We refer to this embodiment as a 'Spinning Can' view. Instead of peeling back a cylindrical panorama, map the image onto a cylinder or drum 210 which can be spun around its vertical and horizontal axis by the user in order to inspect its contents. For example, displaying a camera icon 260 in the center of the drum 210, and using the field of view of camera 260 to define overlay window 270, might make it clearer to the user how the overview image was formed and what part of the scene the camera was focused on. Spinning the camera or the drum around the camera could display the rectified partial image 270 in detail window 220 (the latter not shown in FIG. 2B). It is possible that this interface makes it easier for the user to understand front/back and left/right orientation as well as the relative positions of objects in the scene.

In a preferred embodiment, visual data comprises panoramic scene data captured using a plurality of cameras surrounding the scene and facing inward. As practitioners will recognize, this enables traversals to reflect a user-adjusted 3D-perspective, allowing, among other things, navigation to see hidden objects that would otherwise be occluded from a particular camera perspective.

Figure 4:
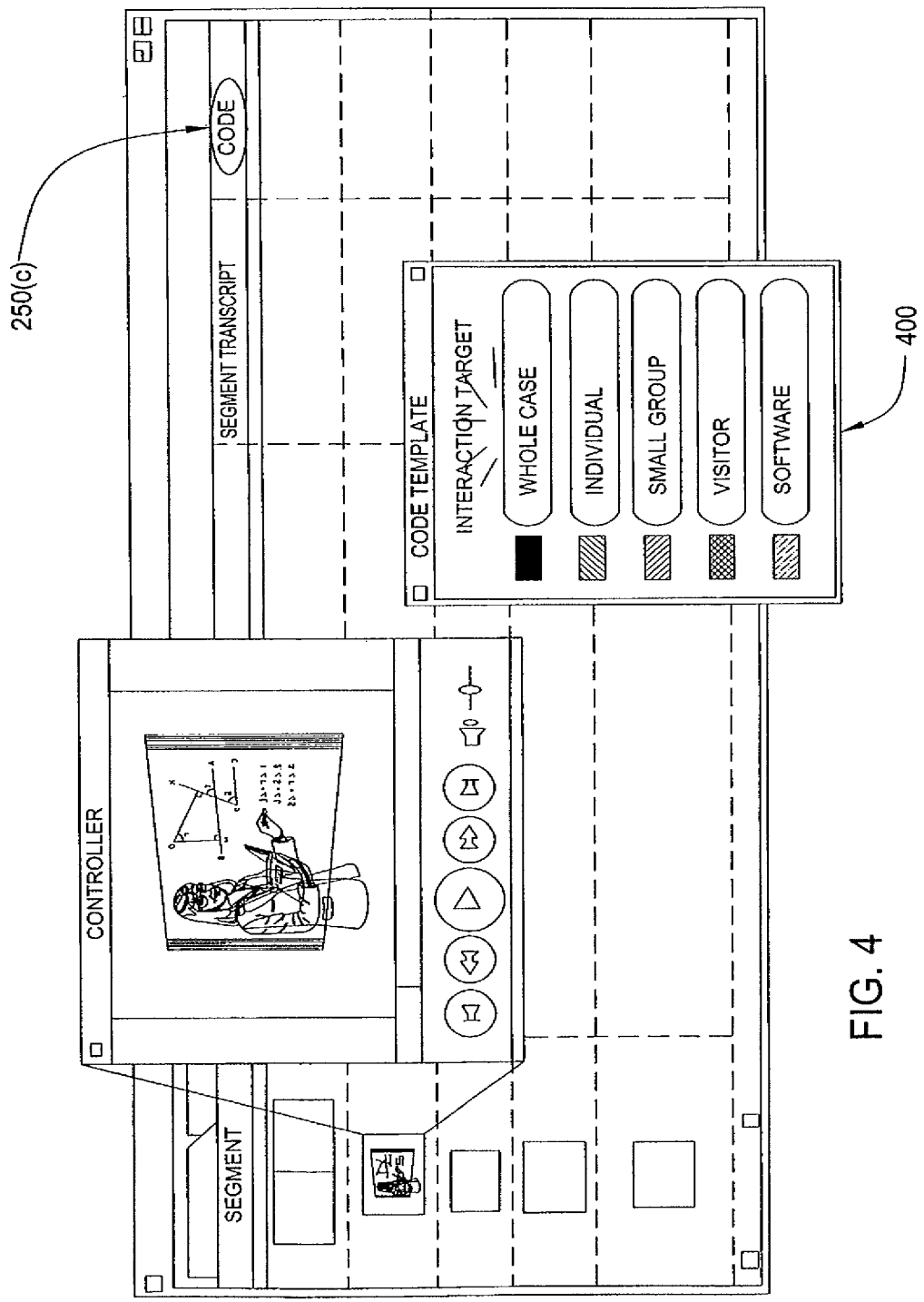
FIG. 4 illustrates a graphical selection template for assigning classification code annotations to a traversal record.

At 130, user annotates the traversal, preferably using the graphical user interface of FIG. 2A to add annotations including free text comments 250(*a*) and classification codes 250 (*c*). As depicted in FIG. 4, classification codes 250(*c*) are predefined tags selected from a coding template menu 400. This feature allows users to rapidly classify traversals based on a uniform taxonomy supporting subsequent data analysis (for example, as described below in connection with FIGS. 6-10). Preferably, the classification labels encoding template 400 are user-definable. In further embodiments, traversal annotations preferably include transcriptions of audio 250(*b*), corresponding to the video recorded in each traversal (which, if not already available electronically, may be automatically generated using conventional speech recognition technology); as well as "meta-data" 250(*d*) descriptive of the traversal segment, for example (and without limitation) names Of characters, name of scene, time/date, etc.

At 140, a persistent record of the annotated traversal is stored, for future reference and study including network publishing and analysis (discussed in detail below in connection with FIGS. 5-10). For many practitioners and applications, the method of FIG. 1 will be performed repeatedly, generating a plurality of annotated traversal records. Worksheet region 230 in FIG. 2A displays an interactive listing of such records. Thus, column 240 identifies each traversal with a representative thumbnail image, and columns 250(*a*)-(*d*) display associated annotations. Video thumbnails may include, for example, still images, panoramic thumbnails, or motion previews.

Note that for the embodiments of both FIGS. 2A and 2B, the visual data in overview window 210 can be traversed by relatively positioning overlay window 200, either by holding fixed overlay 200 and moving overview 210, or by holding fixed overview 210 and moving overlay 200. Both techniques are equivalent and are within the spirit and scope of the present invention; and practitioners may select an approach depending on the particulars of specific applications.

At 150-170, the user may playback the contents of a recorded traversal. At 150, the user interactively selects a stored traversal from the list displayed in worksheet region 230. In a preferred embodiment, available selection mechanisms include using a mouse or other cursor control device to "drag and drop" a thumbnail image from column 240 corresponding to the desired traversal record onto detail window 220. Preferably this resets detail window 220 as well as overview window 210 to the appropriate frame at the start of the selected traversal sequence. Clicking on a "play" button, on screen video control region 215, preferably initiates playback 170 of the traversal in windows 210 and 220.

If the selected traversal is a compound traversal—i.e., a user-specified composite of more than one stored traversal, e.g., compound traversal 320 as shown in FIG. 3—then playback 170 preferably comprises concurrently and adjacently playing back the multiple traversal records, such as in side-by-side panes 340 or in a window-within-window. When the composited traversals include audio channels, at 160 a suitable audio mix is specified for playback 170. The mix can preferably be a user selection of one traversal to be heard with others muted; or a selection to mute all audio; or a user-selected relative fading (specified e.g., using on-screen slider bars), giving prominence to a desired one of the composite traversals without completely muting the others.

Note incidently the variation in FIG. 3, wherein detail window 220 is shown as a "pop-up" window overlapping worksheet region 230, rather than being a fixed region adjacent to overlay window 210 as in FIGS. 2A and 2B. Such variation and others of similar nature, as practitioners will readily recognize, are possible depending on the needs and tastes of particular applications, and are all well within the spirit and scope of the present invention.

A single worksheet region 230 may, in some applications, be used to list and organize the traversals of visual data from more than one source. This may be useful, for example, for purposes of comparing and contrasting similar scenes from different movies, or the work of a single actor or individual in various scenes and videos.

In a preferred embodiment for some applications, an audio channel including spatial audio data is associated with the visual data being traversed. For example, data being traversed may include an audiovisual recording of a scene; alternatively, the visual data may comprise a depiction of a location, such as an image of a concert hall, conference room, or lecture hall, and the associated audio data comprises a recording of music in the concert hall, conversation in the conference room, or a presentation in the lecture hall.

As known to practitioners of the relevant arts, spatial audio is typically captured, for example, by instrumenting the location being recorded with multiple microphones and performing appropriate signal processing on the resulting stereo data.

As one benefit of the present invention, embodiments including spatial audio data preferably store with each traversal record the audio data associated with the spatial territory traversed by the user within the overall scene. For example, a preferred embodiment allows users to interactively define multiple discrete spatial sound zones, such as by graphically placing "virtual microphone" icons within overview window 210 (not shown). The audio data stored with a particular traversal would then reflect, at each frame of the traversal, the appropriate sounds audible within the sound zone associated with the spatial location of that particular frame. In a further feature enabled by the invention, the traversal record can be annotated (as discussed above in connection with FIG. 1 task 130, and graphical interface region 250*b*) with a transcription of the spatial audio data included in the record. Transcribing only the spatially relevant audio thereby filters out irrelevant global noise and offers several benefits. For example, accuracy of automated speech recognition is improved, because extraneous noise from other sectors is filtered out, Likewise, if a transcript is produced, it will contain searchable text data that is focused on utterances only within the relevant space, making textual search more efficient and effective.

B. Sharing and Collaboration

1. Web Publishing

Figure 5:
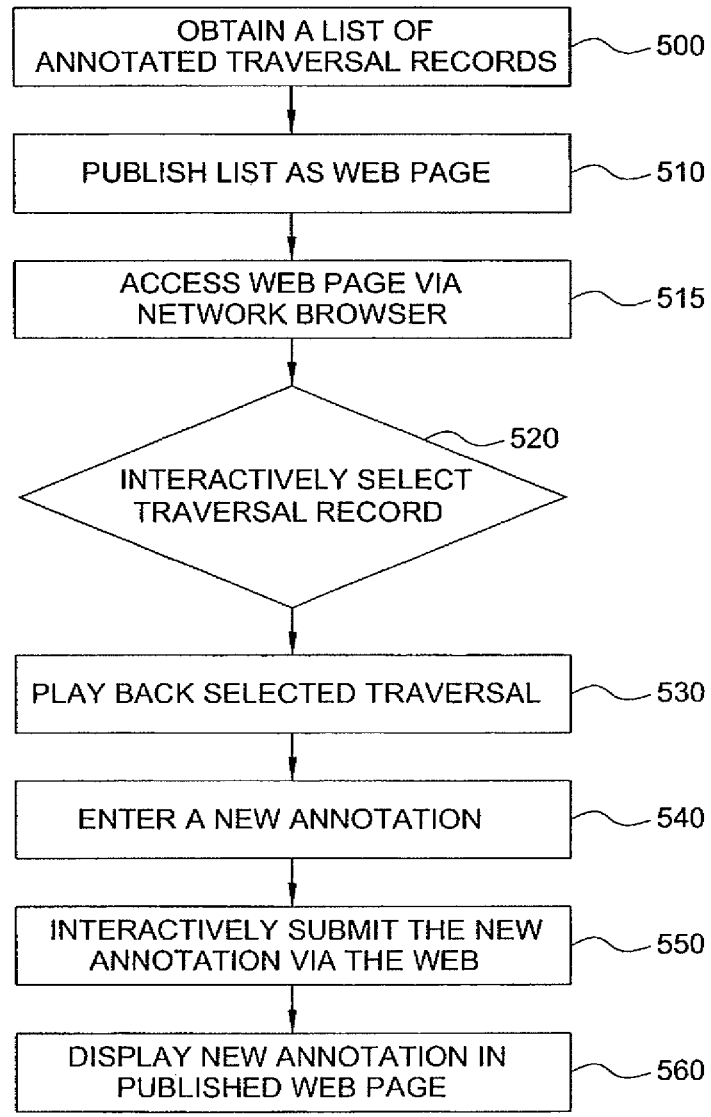
FIG. 5 is a flow diagram illustrating a method for publishing and sharing annotated "point-of-view" traversals of visual data with members of a network community.

FIG. 5 is a flow diagram illustrating a method for publishing and sharing annotated "point-of-view" traversals of visual data with members of a network community. At 500, we begin with a list of annotated traversal records. The list may be created for example, using the methods and apparatus described herein in connection with FIGS. 1-4, and in particular the contents generated in worksheet region 230. At 510, this list is published as a web document or web page; preferably exporting utilities are provided, as known in other contexts to those skilled in the art, to facilitate or automate this process for users. The web page is preferably published on a public network such as the Internet, or a private corporate intranet, depending on the nature of the application. At 515, the web page is accessed by other users via the network, preferably using standard web browsers. At 520, a user accessing the web page interactively selects a traversal record of interest from the displayed list, such as by "clicking" on it. In response, at 530 the traversal data corresponding to the selected record is played back for the user, typically in a designated region of the web page or alternatively in a popup player window.

Having viewed a traversal, the network user may be inspired to add his or her own annotations regarding the traversal content. In that case, at 540 the network user interactively enters a new supplemental annotation, and at 550 interactively submits the new annotation via network to a server hosting the web page. The web page preferably utilizes interactive online form technology to capture new annotations in this manner, as well known to practitioners in other contexts. At 560, the new annotation is added by the server to the published web page, and displayed as part of that page to all network users subsequently accessing that page.

In preferred embodiments and applications of the present invention, network users are further enabled to form communities and sub-communities reflecting common interests. (Note: We occasionally refer herein to an embodiment of the present invention as a DIVER™ system, standing for Digital Interactive Video Exploration and Reflection technology, and to a worksheet listing 230 of stored traversals as a DIVE™ worksheet.) For example, preferred system in accordance with the present invention may keep track of, and publish to network users, usage data of common interest such as Most Popular DIVES, Recently Posted DIVES, Who Has Visited Recently, and Who is DIVING Now. Users can preferably subscribe for email notification of new published DIVEs or DIVE updates, and can browse directly at 515 to a designated or highlighted pane within a particular published worksheet 230 when a link in the email message is selected (using. HTML anchors within a page).

Further features of preferred network embodiments include a "HyperDiving" capability, allowing worksheet 230 entries (e.g. annotation fields 250) in the published web page to hyperlink directly to reference material types such as;
 an existing video DIVE;
 another published DIVE worksheet;
 a web URL (I.e., a web page, or a web document reference); and
 an uploaded document (in which case the user creating such link will preferably be provided an interface to browse the user's local directory and select and upload a file to the server, which file will then be associated with the hyperlink).

In preferred embodiments for collaborative network applications, users can set access controls for DIVES, using access methods such as "Public" (all registered and non-registered users), "All Registered" (all registered users), and specific combinations of individual and aggregate defined Users and Groups. Different classes of DIVER users preferably may be assigned appropriate classes of rights and privileges including "Full Rights" (user can create and modify DIVES), "View and Annotate Rights" (user can only view and annotate DIVES) and "View Only" (user can only view a DIVE and its comments; users may not add comments). For example, it is possible that non-registered users should all be "View Only."

2. Network Video Distribution Issues

Delivering digital video across the Internet in some sense well-known in the art and straightforward; but achieving consistent, high performance can be very challenging. Files are large, viewers are discriminating for high quality and performance, real-time requirements are demanding, pipes are still narrow—and the Internet is often unreliable, congested, slow and bursty. Reliable protocols (i.e., FTP, HTTP and TCP) guarantee delivery but can suffer from unacceptable levels of latency and delay and do not ensure timely data delivery. Unreliable protocols (such as UDP or RTSP) provide faster performance but may suffer from data loss and as a result a lack of integrity for content at the receiver side. Video compression algorithms reduce bandwidth but reduce quality commensurately. Handling digital video for more than just playback—including authoring, sharing, collaboration, and specialized interaction represents a very significant challenge, and to complicate matters, these issues, which are significant enough for conventional linear video content, become exponentially more difficult when working with panoramic and ultra high-bandwidth video for authoring, interaction, collaboration and delivery.

Fortunately, there are a large variety of approaches for handling digital video on the Internet and the landscape is rapidly evolving. Indeed, new schemes for managing video appear on this technology front quite frequently, and opportunities arise on a regular basis to create new video innovations. Because many applications and embodiments of the present invention may benefit from high-performance delivery of digital video content over the Internet, this section surveys some of the current and emerging technology options for practitioners to consider in this context:

(a) Streaming Video Algorithms. New approaches to video streaming algorithms and protocols including specialized algorithms that may be appropriate for delivering video based on the unique characteristics of the present invention.

(b) Video File Transmission Protocols. This solution category includes technology approaches that use software-based file transmission protocols including a review of "Next Generation Protocols" used for high-speed Internet file transfer such as peer-to-peer and multicast (often stateless in nature).

(c) Media Distribution Methods. There are methods for the computation, storage and distribution of media that can be used for provide enhanced performance such as content caching and replication, Federated servers and databases, grid computing, and specialized ultra high-speed networks, etc.

(d) Video Compression Algorithms. This solution category includes video compression algorithms. The video compression algorithm review takes a look at alternatives and evolutionary paths of the MPEG2 worldwide video compression standard.

Note: We occasionally refer below to an embodiment of the present invention as DIVER'M (standing for Digital Interactive Video Exploration and Reflection) technology, and to a worksheet listing 230 of stored traversals as a DIVE™ worksheet.

(a) Streaming Video Algorithms

There are a variety of well-established streaming media techniques in the field of digital video. However, none of the streaming algorithms were designed to meet the unique requirements of the present invention. For the purposes of this document, new classes of streaming algorithms designed to meet the particular requirements of the present invention will be referred to as DIVERstreams. To handle DIVERstreams, the streaming algorithms should preferably be able to address the very high-bandwidth nature of the media, the concurrent stream representation (overview and virtual camera), linear and/or panoramic video characteristics, and the requirement to provide space-time random access into the virtual camera movie to enable zooming and panning the scene display through space and time. A number of candidate approaches are presented below.

(i) Adaptive Multi-Resolution

An Adaptive Multi-Resolution Storage and Networked Access method is proposed to handle DIVERstreams where the stream will adapt to the available network bandwidth and CPU capabilities. A "Base-Pair" of Movies, with a moderate-resolution overview movie and higher resolution virtual camera movie would be utilized. Additional movies derived from the high-resolution base pair are stored at progressively smaller resolutions, essentially forming an "Image Pyramid", a stack of images at varying resolutions (Ramella 2001). This scheme would adapt to available bandwidth and CPU capabilities (using a feedback mechanism) to determine the resolution level to use for playback. It is proposed to use "pyramid resolution switching" based on real-time monitoring of network bandwidth and desktop CPU performance measurements.

(ii) Compressed Data Subsampling

A Compressed Data Subsampling scheme is proposed to permit space-time random access into a compressed high-resolution virtual camera movie to produce on the fly compressed and space-time cropped virtual camera data streams. Although video compression reduces storage and network cost, it increases processing requirements, as data must be decompressed before processing. The overhead to decompress is very high: compression algorithms (such as JPEG or MPEG) require between 150 and 300 decompression instructions per pixel, corresponding to 2.7 billion instructions for each NTSC second of quality video handled. The data must be compressed after processing, which adds significantly more overhead. Processing video after decompression is called spatial domain processing and this is the most common method utilized. A method to obviate these issues is to process video data directly in its compressed form (Smith 1993, Arman 1993), reducing the amount of data required for processing as well as the complex and time consuming compression and decompression cycle. This approach is called compressed domain processing and it converts the spatial domain process into its frequency domain equivalent. Compressed data is processed by entropy decoding the compressed bitstream to recover sparse vector data In the frequency domain, applying compressed domain operator(s), and quantizing and compressing the result. Note that compressed domain processing may be performed on the format of the compressed data, In frequency space or alternate coding representations.

A compressed representation of DIVER video that would support processing and video scene subsampling in the compressed domain is to be used In the proposed scheme. This could be used for Interframe or Intraframe video algorithms. The method, when applied at the server, would select the cropped space-time video stream region of interest within the compressed data stream and transmit only the corresponding compressed stream for the virtual camera path, along with the compressed overview movie. An alternate approach, using the client to a greater extent, Is to transmit the compressed full resolution virtual camera video along with the space and time coordinates of the rectangle that defines the virtual camera path and to then select and decompress the appropriate region of the movie on the client side. The server side approach is recommended as more promising but does require significant server processing.

(iii) Progressive Refinement

A Progressive Refinement scheme is proposed to present progressively higher resolution DIVER video imagery over time as the user Interacts with the DIVE. The progressive refinement concept (Cohen 1988) originated In the computer graphics area for the progressive and rapid rendering of complex 3D scenes using radiosity algorithms. In the DIVER case, progressive refinement would be applied instead to digital video streams using an analogous mechanism. This method could also work In conjunction with the multi-resolution algorithm described above. In this case, the lowest or lower level of the image pyramid would be transmitted first, followed by subsequent levels of the pyramid. Standard interpolation algorithms would be used to add one level of the pyramid to the next, and if needed, to generate intermediate pyramid levels. The lowest resolution version of the scene is sent initially as a starting point and is used to produce the overview movie and the virtual camera. As the user interacts with the movie over time, successively higher resolutions of video are transmitted to the client. The video will appear as higher and higher quality as the user interacts more and more with a particular video DIVE.

(iv) Server Side Recompression

A Server Side Recompression scheme is proposed to allow for creating a real-time compressed version of the cropped space-time virtual camera movie on the fly. In this method, the high-bandwidth high-resolution virtual camera original is decompressed on the server. An image size reduction and filtering process is used to reduce resolution and to produce uncompressed video at the server. The uncompressed video is recompressed at a lower resolution and transmitted in a compressed form. This scheme can be used for both the overview and the virtual camera. This model functions on-demand and will need to be able to handle many concurrent recompressions when users are viewing many DIVES. This method would be likely be used in the case only where very high-performance distributed and parallel processing arrays are available for video transcoding (decompression and recompression) at the server level.

(v) Foveal Display

A "Foveal Point" Concept (Chang and Yap 1997) is proposed to provide high-resolution in the area of interest in the virtual camera and overview movies. The Foveal Point concept mimics the behavior of the human eye. Visualization is primarily a "psycho-physiological phenomenon." This fact can be exploited in solving current challenges of visualization research. A key fact of biological vision is its use of "foveated images" where the resolution is much higher at the fovea than at the periphery. These classes of images have remarkably minimal data density compared to standard images. To adjust for the lack of uniform resolution, one must provide new degrees of "active control" to the viewer (Chang, Yap and Yen 1997). In the scenario proposed for DIVER, there would be one high-resolution focused virtual camera image for the region of interest (the cropped space-time area) overlaid with a coarse granularity "big picture" (this concept, in an advanced implementation, may be used in conjunction with eye tracking to precisely provide resolution based on the region of interest to the human eye).

(b) File Transmission Protocols (i) Standard Protocols

HTTP, HTTPS, FTP, WebDAV—these are a number of standard protocols on the Internet now used for the transmission and sharing of files. Each of these protocols and systems can also be used for transmission, sharing and distribution of large media files. The greatest advantage of these protocols is their ubiquity and the greatest disadvantage is their lack of specific support for high-performance delivery of rich media content.

(ii) Next Generation Protocols

FTP ("File Transfer Protocol") was developed in the early 1970s as a protocol mechanism to transfer files across the Internet. This standard establishes a session between a client and server where data is segregated into parcels of information and transferred in small network packets. Under typical packet loss and RoundTrip Times (RTT), FTP typically operates in a congested and delayed environment. Once network loss and delay reach certain limits, increasing bandwidth may have minimal or no advantage for data transmissions, and even on very high-speed links, the data rate may not be able to exceed a fairly low threshold resulting in extraordinary inefficiencies on such links. FTP is useful because it is highly ubiquitous but it can be very limited for efficiency when packet loss rises when used for the types of large file size transfers now needed across the Internet.

Innovative solutions have recently emerged to handle the fundamental root cause associated with FTP protocol inefficiencies using a number of different and unique methods. A new set of protocols are now available that are said to "provide the reliability of TCP with the speed of UDP"; these schemes can offer remarkable improvements over FTP with quantified speedups ranging from 5× to 10× or more.

Figure 12:
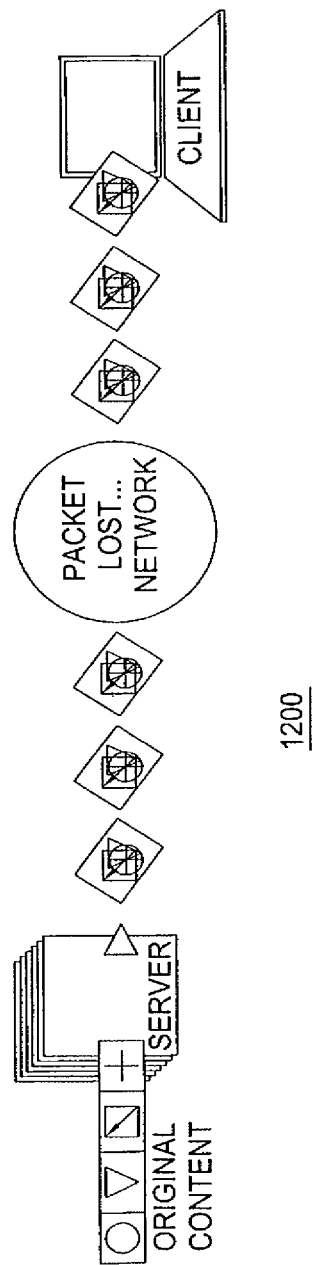
FIG. 12 illustrates prior art technology for transmitting "MetaContent" packets via "Content Cycling."

One particularly interesting approach is that of MetaContent (Digital Fountain 2002), referred to here as Content Cycling, where content is transmitted in an order independent fashion. As shown in FIG. 12, the data distribution technology for Digital Fountain Is fundamentally different than that of a conventional file server or transmission protocol. The architecture consists of a Digital Fountain Server, a Digital Fountain Client and a patented concept called "MetaContent", where mathematical "metaphors" are used to reconstruct data at a receiver. With MetaContent, data is received as a stream of information that is "order Independent", similar to a multicast video stream. Packets containing independently generated Meta-Content are completely interchangeable and a receiver may tap into the "fountain" of data at any time. It does not matter which Meta-Content the Fountain Client receives and in what order. Only the quantity of independently generated Meta-Content received determines when the original content can be reconstructed. Thus, if packets containing Meta-Content are lost in transit, any equal amount of Meta-Content contained in subsequently received packets is just as useful for reconstructing the original content. Rather than rigidly sequential data delivery as performed by most transmission protocols, in this case, there is a cyclical repetitive data scheme utilized.

Dramatic Improvements in transmission speed can be gained with Digital Fountain when compared with standard protocols such as FTP. Improvements in transmission compared with FTP are often 2.5× to 5× or greater in typical cases, and can be as high as two to three orders of magnitude. In addition, in certain cases, Digital Fountain can provide link utilization as high as 95%. Congestion flow control ensures fairness to other network traffic and the scheme uses a small (multiple megabytes) memory footprint. Digital Fountain requires proprietary client-side software for all recipients of the data as well as the Transporter Fountain on the server side. A server license must be purchased for the use of the Transporter Fountain platform. Digital Fountain uses the UDP protocol and this may require firewall configuration work from the IT or Networking Departments of media users.

Although the advantages of Digital Fountain can be dramatic, its advantages are very context-sensitive based on network speed, latency and number of hops; practitioners should review with caution the potential application of this capability to ensure that it would only be used in appropriate situations.

(c) Media Distribution (i) Content Caching

The DIVER Project can consider a variety of content caching approaches to improve the performance of video for end-users. The DIVER group could develop one set of approaches using its own development resources. This might include unique mechanisms to replicate video content from a central DIVER server to regional DIVER servers using a synchronization algorithm to distribute frequently accessed video DIVE content to a distributed and local network of DIVER servers. When a user requests the content, they could be redirected to the closest DIVER server that meets the specified 1 criteria (i.e., least traffic, least IO<ld, closest location or combination of these metrics). Another option would be to exploit commercial content caching products (Vichare 2002). An additional option would be to combine an internally developed caching model with commercial caching products.

Content networking products (from suppliers such as Inktomi, Akamai, CacheFlow, Cisco and Network Appliance) are being deployed to improve the performance of viewing and interaction of rich content by end users on intra nets and the Internet. These products provide infrastructures for delivery of static, streaming, and dynamic content in a scalable, reliable and secure method. The elements of Caching include content that is stored at the network edge, close to the end user, to improve performance and minimize upstream bandwidth; Content routing, which routes content to create a directory of content locations and network and server loads using the directory to route requests to the optimal data center or to provide the closest content; and Content distribution and management, which is the proactive, smart distribution of static, dynamic, and streaming content from any point of origin to the network edge. A caching device intelligently and rapidly selects and stores Web data for easy access on the network. The more frequently requested content is stored on the network, taking a large burden off Web servers and firewalls. As a result, the network can more quickly fulfill requests for Web pages and rich media content. Caching devices are deployed in three different scenarios: they can sit in front of Web servers in a "reverse cache" to reduce server load and speed site performance; they can sit where an enterprise LAN faces the WAN in a "forward cache" to reduce traffic on the WAN; they can reside at a variety of "distributed cache" points along an ISP's or carrier's backbone to alleviate traffic along the delivery route.

Practitioners may assess the various content caching options available for optimizing access to DIVER content in a distributed environment.

(ii) Federated Servers and Databases

Federated Servers and. databases are potentially interesting technologies for practitioners to consider for DIVER. Preferred applications include developing a DIVER environment replicated across a distributed network of Video Collaboratories; for such applications it is advantageous to have a system that allows for media stored across distributed databases. This would allow for Individual DIVER centers to each maintain their own DIVER servers and content but still be able to share content and metadata globally across all DIVER sites.

A federated system is a special type of distributed database management system (DBMS) (Rutledge 2001). A federated system allows you to query and retrieve data located on other DBMSs (such as Oracle, Sybase, Microsoft SQL Server or Open Source databases such as mySQL). SQL statements can refer to multiple DBMSs or individual databases in a single statement. For example, you can join data located in an Oracle table, Microsoft SQL Server and mySQL view. In a federated database environment, a single, synchronous view is presented from multiple heterogeneous data sources. The federated system model Is an appropriate architecture for small and medium-weight applications that have modest transaction and performance requirements.

A federated system consists of a database that will serve as the federated database (a Database instance) and one or more data "sources." Catalog entries identifying data sources and their characteristics comprise the federated database. DBMS and data comprise the data source. "Nicknames" may be used to refer to tables and views located in the data sources. Applications connect to the federated database just like any other database and expect to utilize the content. as if it were one consolidated database.

After a federated system is set up, the information in data sources can be accessed as though it were in one large database. Users and applications send queries to one federated database, which retrieves data from the data sources. A federated system may operate under certain restrictions; for example, distributed requests are limited to read-only operations.

(iii) Grid Computing

A variety of developments in the last few years have catalyzed the area of Grid Computing (Foster 2001, Chen 2002) into a plausible solution for large-scale distributed computing tasks. There has been an initial focus on research applications for scientific visualization, image rendering, aerospace computation and commercial applications such as multi-player multimedia gaming (also called MMG for Massively Multi-player Gaming and core to the IBM initiative for Butterfly.Net (http://www.butterflv.net)). If DIVER use becomes widespread across a network of Digital Video Collaboratories, and there is an extensive need to process large quantities of large file size panoramic and conventional video across a distributed user base, then grid computing may be a very interesting solution for consideration. Grid computing is intriguing because it allows capturing Idle CPU cycles on a mass scale essentially making highly efficient use-of computing resources (and hence significantly lowering costs of computation). A checklist to determine if a computing task maps to a grid computing solution can be found in (Dyck 2002). A typical grid-computing "checklist" includes a determination if the computing needs meet the following criteria:

Decentralized administrative structure

High levels of computation required

Computation can be distributed into component packages

Data is already distributed across many locations

Fast or predictable response time is not required

Computation is tolerant of software and hardware failures

The DIVER needs for digital video processing in a particular application should be reviewed by practitioners to determine if there is a potential match with a grid computing approach. The value for DIVER of grid computing may also, for example, be enhanced in applications that implement the digital video analysis tasks listed below:

Automated transcription of audio to searchable and indexed text

Panorama de-warping

Video "coding" into behavioral 'categories and statistical analysis

Video transcoding to low bit-rate and video streaming formats, particularly as these capabilities grow in sophistication and become more and more computationally demanding. The Globus Project (http://www.globus.ora) is an organization managing Open Source development, research and prototypes for grid computing. The Globus Toolkit 2.0 is available now for production purposes; the Globus Toolkit 3.0, is focused around the Open Grid Services Architecture (OGSA)—an integration of grid computing with Web Services frameworks.

(iv) Peer to Peer

Figure 13:
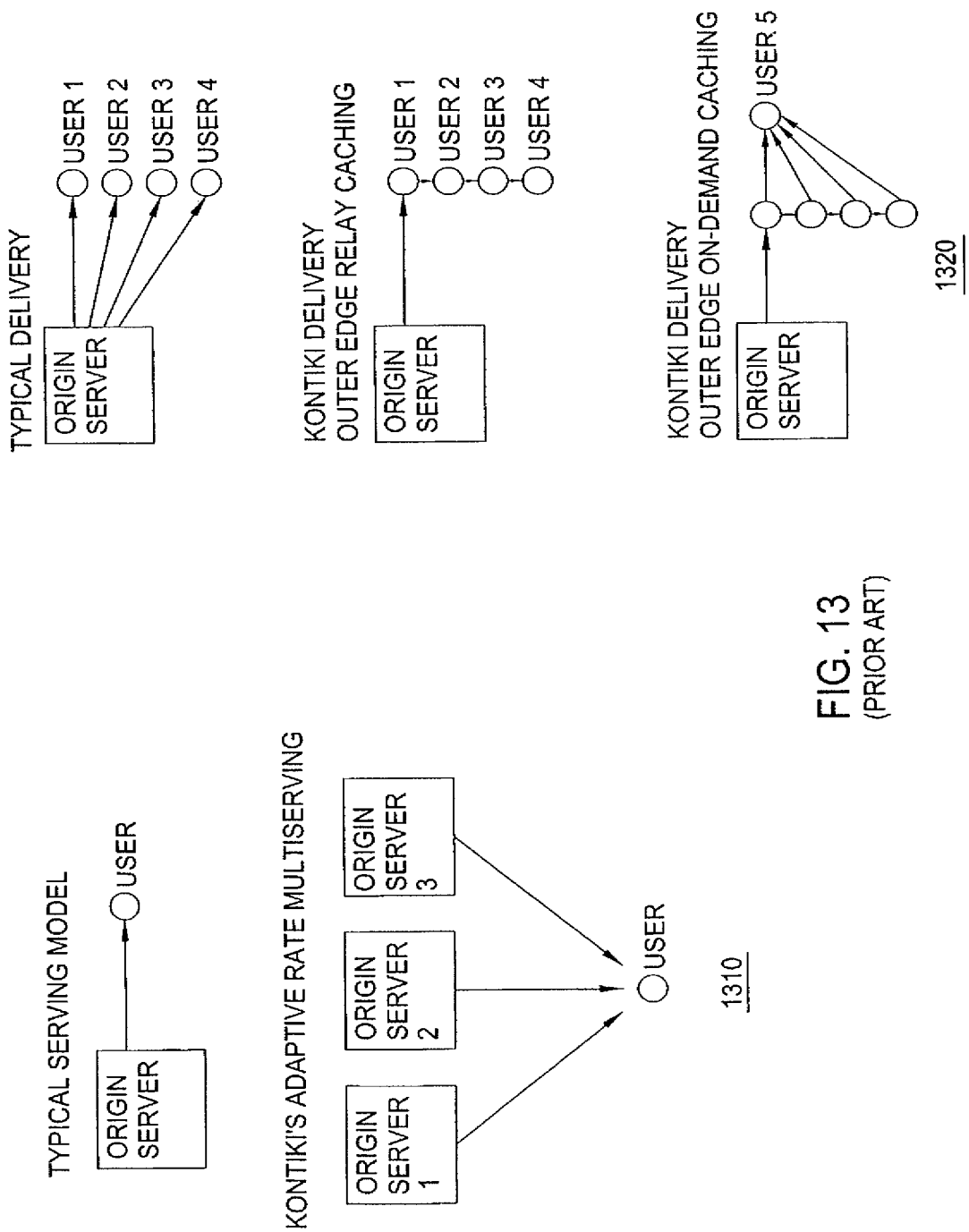
FIG. 13 Illustrates prior art architecture for adaptive rate multi-serving and outer-edge content caching.

A set of applications that provide publishing security, delivery, and tracking of digital media in the enterprise are available in the Kontiki (htto://www.kontiki.com) Delivery Management System (architecture shown in FIG. 13). This technology employs peer-to-peer file sharing and a large file distribution model where data is cached in a distributed fashion across wide and local area network nodes, once content has been accessed at a node. As data is accessed more frequently by an increasing number of users, data is distributed to more nodes, and access becomes faster for content. The technology is similar to large-scale peer-to-peer file sharing capabilities but is focused on a more reliable, secure and enterprise strength delivery of rich media. The Kontiki solution requires a proprietary client and a server module.

The technology is based on Bandwidth Harvesting (including Adaptive Rate MultiServing (where Kontiki monitors the response time and available bandwidth of, each computer that is serving the file, and adaptively requests more data from the computers that provide the best throughput), Caching Content (at the outer network edges), and Time Shifting (where Kontiki's network directory builds up lists of media users who have reserved upcoming one-time deliveries and ongoing deliveries (such as a weekly news summary) and automatically delivers these files at off-peak hour)), Digital Rights Management and a Secure Distributed Network Management Protocol.

The speed advantages of this approach are considerable, and similar to Digital Fountain, the paybacks can be substantial in various scenarios with increases in speed of multiple factors or orders or magnitude (i.e., when a media file is locally cached on a nearby desktop machine on the local network).

(v) Handheld and Mobile Video

The area of handheld and mobile devices continues to advance at a dramatic pace, with new models of handhelds and cell phones offering color. screens, higher memory, bandwidth and storage. It is logical to consider the use of these devices as a platform on which to deploy media distribution. For example, the data storage cards such as CompactFlash, SmartMedia, and others, offer data storage anywhere from a few megabytes up to a quarter of a gigabyte or more. This level of storage is ideally suited to handling compressed digital video files. It is conceivable to use linear or panoramic video content on this new class of high data storage enabled devices. A strong solution for displaying high-quality digital video on handhelds has just been released by Kinoma (htto://www.kinoma.com). Kinoma offers an authoring environment that allows taking an input source movie and converting it into a specialized format suitable for playback and interaction on a handheld device.

To deploy video DIVES on handhelds, it is worthwhile to consider a variety of video coding options. For example, the video for a DIVE may be represented in a "scalable" fashion so that the content is generated at a variety of bit rates, including bit rates suitable for low-end devices. Alternately, the video could be transcoded to a new format designed for low bit-rate video on handhelds. Finally; a "smart" representation for the video could be used that would automatically scale to the available computing power, screen size, etc.

(d) Video Compression (i) Overview

Video compression algorithms are a critical part of the overall video delivery picture. The algorithms used will play a key role in determining file size, transmission time, picture quality, editing capability, and compliance with industry standards. There is a constant stream of innovative new developments in the video compression arena with many strong claims made by a multiplicity of vendors regarding file size and picture quality. It is suggested to proceed with caution in this area, as new compression algorithm requires a substantial time and resource investment and commitment. Any new compression algorithm should be evaluated with regards to fundamental design parameters-compression ratio, file size, transmission times, standards compliance, picture quality, openness, etc. Many suppliers highlight their video compression file size and rate information only, but this is inadequate for evaluation. A critical determinant for a new Codec Is picture quality. There is no established and common quantitative metric measuring picture quality (although it could be done using a metric such as Signal to Noise ratio). Given a lack of quantitative data, testing must be conducted with the target user community to ascertain if picture quality will meet the needs for acceptable quality video.

(ii) Standards

MPEG-4 is an ISO/IEC standard developed by MPEG (Moving Picture Experts Group), the committee that also developed the worldwide standard known as MPEG-1 (resulting in Video CD, PC playback, MP3) and MPEG-2 (now in wide use across DVD and Digital Television). See, e.g., http://mpeg.telecomitalialab.com/standards/mpeg-4/mpeg-4.htm. MPEG-4 is the result of a new international effort involving hundreds of researchers and engineers from all over the world. MPEG-4 builds on the proven success of three fields (Digital television; Interactive graphics applications (synthetic content); and Interactive multimedia (World Wide Web, distribution of and access to content). MPEG-4 provides the standardized technological elements enabling the integration of the production, distribution and content access paradigms of the three fields. Related standards MPEG-7 (Standard for Content Description) and MPEG-21 (Multimedia Framework) are being developed currently and will likely be relevant with respect to MPEG-4. MPEG-4 is an object based video standard and its streaming delivers the same quality video streaming as MPEG-2, the current industry standard, but uses only one third of the MPEG-2 bit rate. This bit rate reduction at the same quality level is quite substantial and yields significant speedups in transmission time. MPEG-4 video provides very high quality across the bandwidth spectrum—from cell phones up to high bit rate broadband—that rivals the best proprietary compression algorithms available today.

Apple Computer strongly supports MPEG-4. See, e.g., http://www.apple.com/mpeg4/. MPEG-4 will be an integral element of QuickTime 6 and Real Networks has adopted the standard as well. However, and in notable fashion, Microsoft has yet to embrace the standard and is presenting an alternative scheme called "Corona" (Windows Media g). See http://www.microsoft.com/windows/windowsmedia/thirdgen/default.asp.

(iii) Open Source (Codecs)

VP3 (www.vp3.com) is an "Open Source" video Codec. The Codec allows open source community access to a video Codec source code base with options to enhance and extend the video processing code. VP3 targets high quality video and high levels of compression, with rapid decompression on PC and Macintosh computers. Content can be streamed over the web, or played off of a local disk drive, CD, or DVD. VP3 is currently supported in QuickTime and supports encoding (in QuickTime 5.x Pro) and decoding (QuickTime 5.x standard) for video content. Encoded video files are streamed from the QuickTime Stream Server or served off a web server for progressive download. VP3 is compatible with QuickTime for Mac and PC, and it enables encoding with QuickTime Pro, or any other QuickTime compliant encoding application.

VP3 files can also be played back with Windows Media Player (where filed are compatible with both Direct X and Video For Windows platforms). VP3 for Windows allows encoding in VP3 video using Video for Windows compliant encoders (such as Adobe Premiere and Cleaner). The decoder portion of the Codec is both Video for Windows and DirectShow compliant.

Since VP3 is Open Source software, Codec sources are available for free and can be integrated into custom applications. For video capture and encode, there is limited support for VP3 in the industry, although video capture and encoding capabilities are available from On2 Technologies, the originator of the Open Source Codec for Video.

There is also an Open Source audio Codec, called "Ogg Vorbis" where Ogg Vorbis is a non-proprietary, open, patent and royalty-free, audio format and Codec for mid to high-quality audio at fixed and variable bit rate for delivery over the Internet.

(iv) Open Source (Servers)

Real Networks has announced the first major Open Source streaming media server—the "Helix" Universal Server, see http://www.realnetworks.com/info/helix/index.html which supports a large variety of media Codecs (i.e., QuickTime, MPEG-2, MPEG-4, Windows Media, Real Media, etc.) and also provides access to an Open Source code base for enhancing and extending the media server. This new server may be extremely useful to practitioners when implementing new classes of streaming media algorithms and protocols as DIVERstreams per the outline above. It may also be useful to build custom Helix encoders and client-side players (called "Helix DNA Player") for DIVER.

Table 1 provides a list of the technical references on processing and distribution of digital imagery cited in this section, for further reference and consultation by interested practitioners.

TABLE 1—REFERENCES

Foster, I Kesselman, C., Tuecke, S. (2001) "The Anatomy of the Grid: Enabling Scalable Virtual Organizations," International J. Supercomputer Applications, 15(3), 2001.

Rutledge, S., Medicke, J. (2001) "Building Federated Systems with Relational Connect and Database Views," IBM e-business Solution Integration Technical White Paper, 2001.

Arman, F., Hsu, A. and Chiu, M. (1993) "Image Processing on Compressed Data for Large Video Databases," Proceedings of the First ACM International Conference on Multimedia, August 1993.

Smith, B. and Rowe, L (1993) "Algorithms for Manipulating Compressed Images," IEEE Computer Graphics and Applications, September 1993, vol. 13, (no. 5): 34-42.

Vichare, R., and Borovick, L. (2002) "Content Caching Vendor Market Share," 2001, IDCBulletin #26785, March 2002.

Chang, E., and Yap, C. (1997) "A Wavelet Approach to Foveating Images," Proc. 13th ACM Symposium on Computational Geometry, pp. 397-399, 1997.

Chang, E., Yap, C. and Yen, T. (1997) "RealTime Visualization of Large Images over a Thinwire," IEEE Visualization '97 (Late Breaking Hot Topics), Tucson, Ariz. Oct. 19-24, 1997. CD and Video Proceedings.

Ramella, G., Sanniti, G. (2001) "Shape and Topology Preserving Multi-Valued Image Pyramids for Multi-Resolution Skeletonization," Pattern Recognition Letters, Vol. 22, No. 5, pp. 741-751, 2001.

Cohen, M. F., Chen, S. E., Wallace, J. R., Greenberg, D. P. (1988) "A Progressive Refinement Approach to Fast Radiosity Image Generation," SIGGRAPH (1988) 7584.

Digital Fountain Corporation (2002) "Digital Fountain's MetaContent Technology," Technology White Paper, Apr. 23, 2002.

Chen, A. (2002) "Girding for Grid Battle," eWeek Labs Report, p. 37, Jul. 22, 2002. Dyck, T. (2002) "Grid Technical Challenges Daunting," eWeek Labs Report, p. 38, Jul. 22, 2002.

C. Analysis and Exploration

FIGS. 6-10 illustrate the concept of what we call an interactive panoramic video map: namely, an interactive, transformable representation which helps the user go beyond the experience of the surface structure of the event—the primary audio-video record—in order to explore and analyze more abstract patterns and relationships in the video data. We refer to these panoramic overviews as maps to emphasize the analogy with traditional map making and map understanding. As with a traditional map, a panoramic video map is an Image which is more abstract than the real-world spatio-temporal event it stands for. And like a traditional map, to be useful, a panoramic video map filters out extraneous detail while emphasizing those features of the original dynamic event that are useful for the analytical task at hand. However, unlike a traditional paper map, one of the powerful features of a panoramic video map is that it can be interactive; it allows a user to choose a level of abstraction of the scene appropriate to the task at hand.

Scenarios of Interactive Panoramic Map Overviews

In order to clarify the concept of interactive panoramic map overviews, we provide four user scenarios showing how they could be used as applications of the present invention. These scenarios are not exhaustive, as practitioners will appreciate, but are Intended to provide a sense of the challenges and opportunities of human-computer interaction, that can be advantageously addressed using the present invention.

Figure 7:
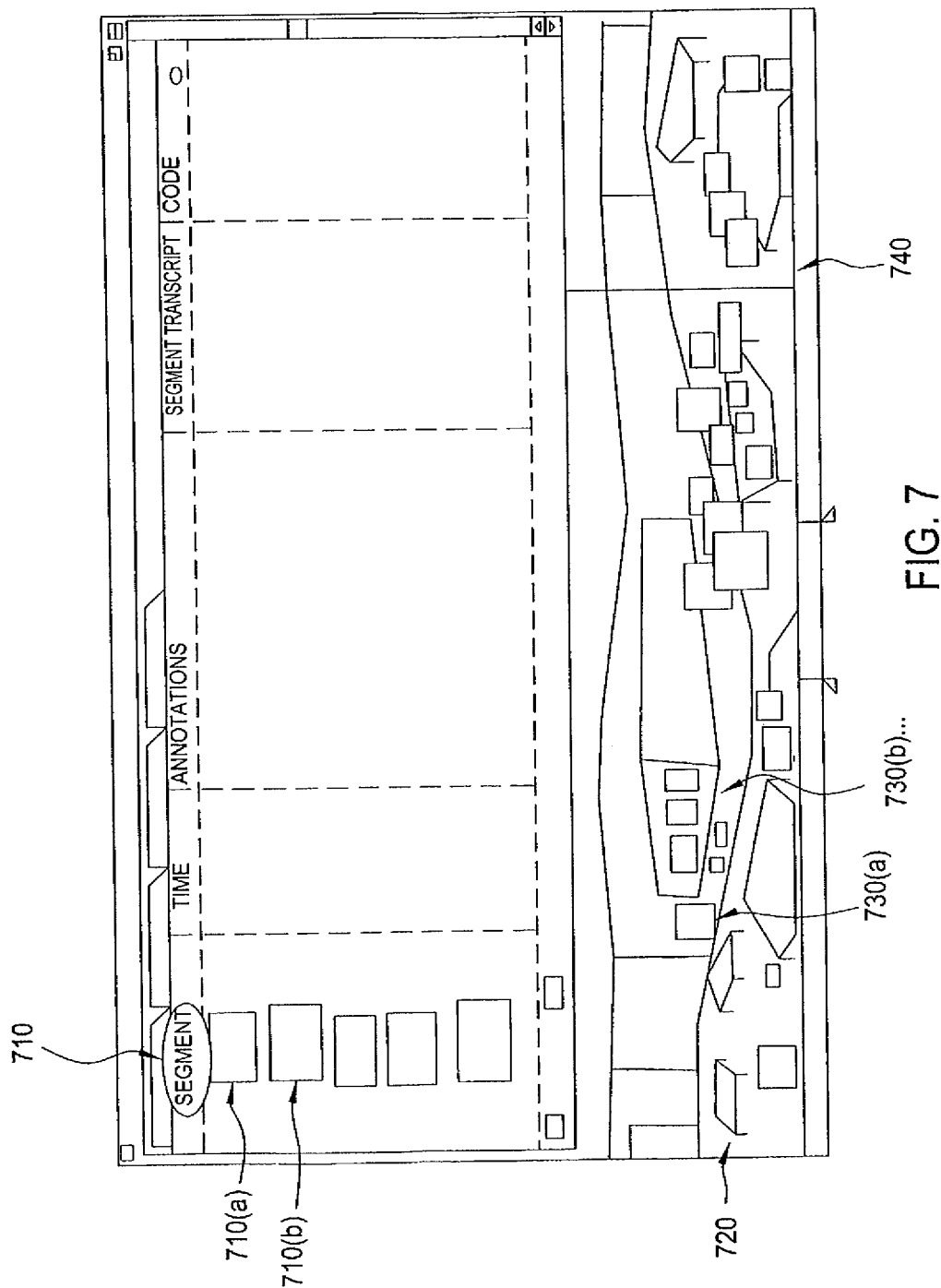
FIG. 7 illustrates one embodiment of a graphical user interface using data maps to explore and analyze visual data traversals.

Scenario 1. Searching for Annotation "Hot Spots" within the Panoramic Overview Map Workspace region 230 is where the user can annotate, organize and analyze the traversals that will constitute a 'DIVE'—the user's particular perspective on the panoramic video event. In the embodiments depicted earlier in FIGS. 2A and 28, worksheet 230 consists of a set of panels, each panel containing inter alia a movie thumbnail 240, time code 250($d$) and a text box 250($a$) for annotating the movie. Now suppose that a researcher who is interested in nonverbal interactions between students and the teachers has created a DIVER worksheet containing several hundred annotated traversals culled from the panoramic video of a classroom event. Assume further that the researcher wishes to get an overview of where the annotation "hotspots" are in the video. In other words, do the annotations cluster around particular points of time and space in the event? A histogram showing the frequency of annotations along the video timeline would be a traditional method of seeing such hotspots. However, the traditional histogram would only show when the annotations occurred, not where. FIG. 7 shows an interface pane where thumbnail previews 730 of the annotated traversals 710 are overlayed on an edge-detected panoramic overview 720.

Note that panoramic overview 720 has been edge-detected (an image processing methodology well-known to practitioners) and cleaned up in order to foreground the spatial position of the traversal thumbnails 730. This display of traversal thumbnails 730 on the 2D map 720 is possible because a video traversal segment's x-y position within the 2D panorama is automatically logged at the time it is marked for annotation. By changing the temporal range of a slider 740, the user would see dynamically how the spatial distribution of annotation activity changes within the scene. In the example below, for instance, there appear to be many annotated traversals of the teacher at her demonstration worktable during this time slice. To get even finer levels of detail, an annotation slidebar 740 could be dragged across the panoramic scene; dragging the slidebar filters the DIVER worksheet to show only those annotated traversals in the display intersecting with the slidebar. Finally, the user could drill down even further by clicking on a thumbnail 730(n) to replay the corresponding audio-clip 710(n) in a detail player window, as described earlier in connection with FIGS. 1-3.

Scenario 2. Using Panoramic Video Maps for Data Overlay

Figure 8:
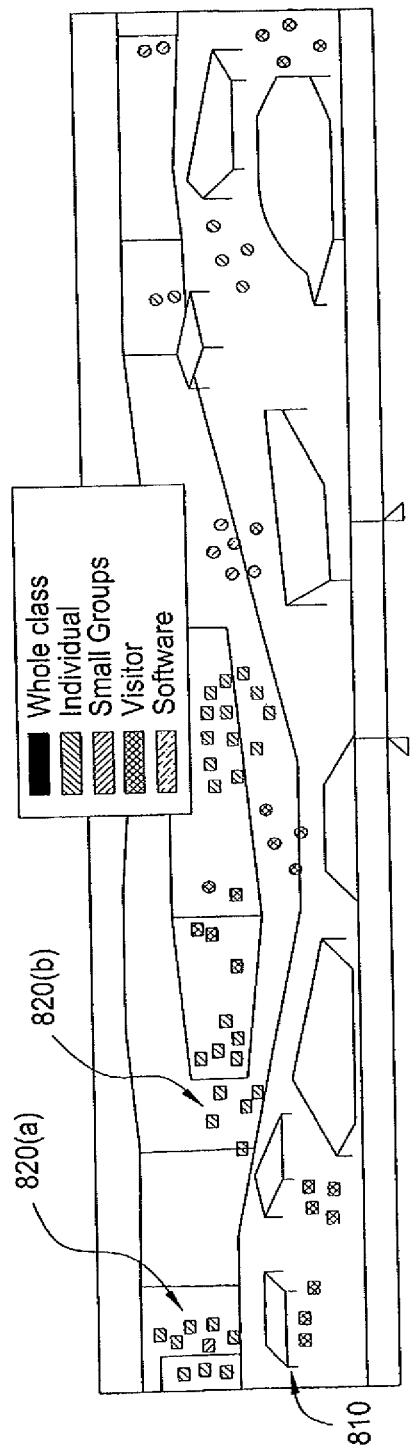
FIG. 8 illustrates a further embodiment of a graphical user interface using data maps to explore and analyze visual data traversals.

Panoramic overviews can also be used for information visualization, especially for exploring hypotheses about the role of the physical setting and its effects on behavior. Assume that a researcher uses DIVER to explore a panoramic video of an actual classroom teaching session in order to develop insights and begin to create categories of analysis. For example, suppose that the researcher develops an interaction profile and uses DIVER to code the video (using classification code annotations, as in FIG. 4) in terms of what kind of interaction the teacher was engaged in, and for how long. Viewing the results of an analysis in a DIVER coding sheet as a list of traversals would not provide much insight about the relationship between interaction mode and the physical setting. However, by having the system overlay the coded data onto an edge-detected panoramic overview—a kind of contour map of the space—the researcher could easily see the distribution of interaction modes—each interaction style preferably coded by a colored dot—clustered in different spatial regions of the room. FIG. 8 depicts such a display, showing indexed data points 820 plotted against an edge-detected panoramic scene 810. (This example shows the significance of alternative embodiments 2A and 2B for certain applications. Here, for example, if the panoramic overview is not spatially intuitive or accurate, its usefulness as a visualization map could be limited.) It is easy to see how this idea can be extended further, within the spirit of the present invention. For example, panoramic video maps could be used to examine how the same physical space might be used by different teachers or for different subjects. Another application for medical education using a panoramic version of a video-laprascope could enable an examination of how the same physical organ would be operated on by students of differing levels of professional vision and capabilities.

Scenario 3. Dynamic Querying of Panoramic Video Data

Figure 9:
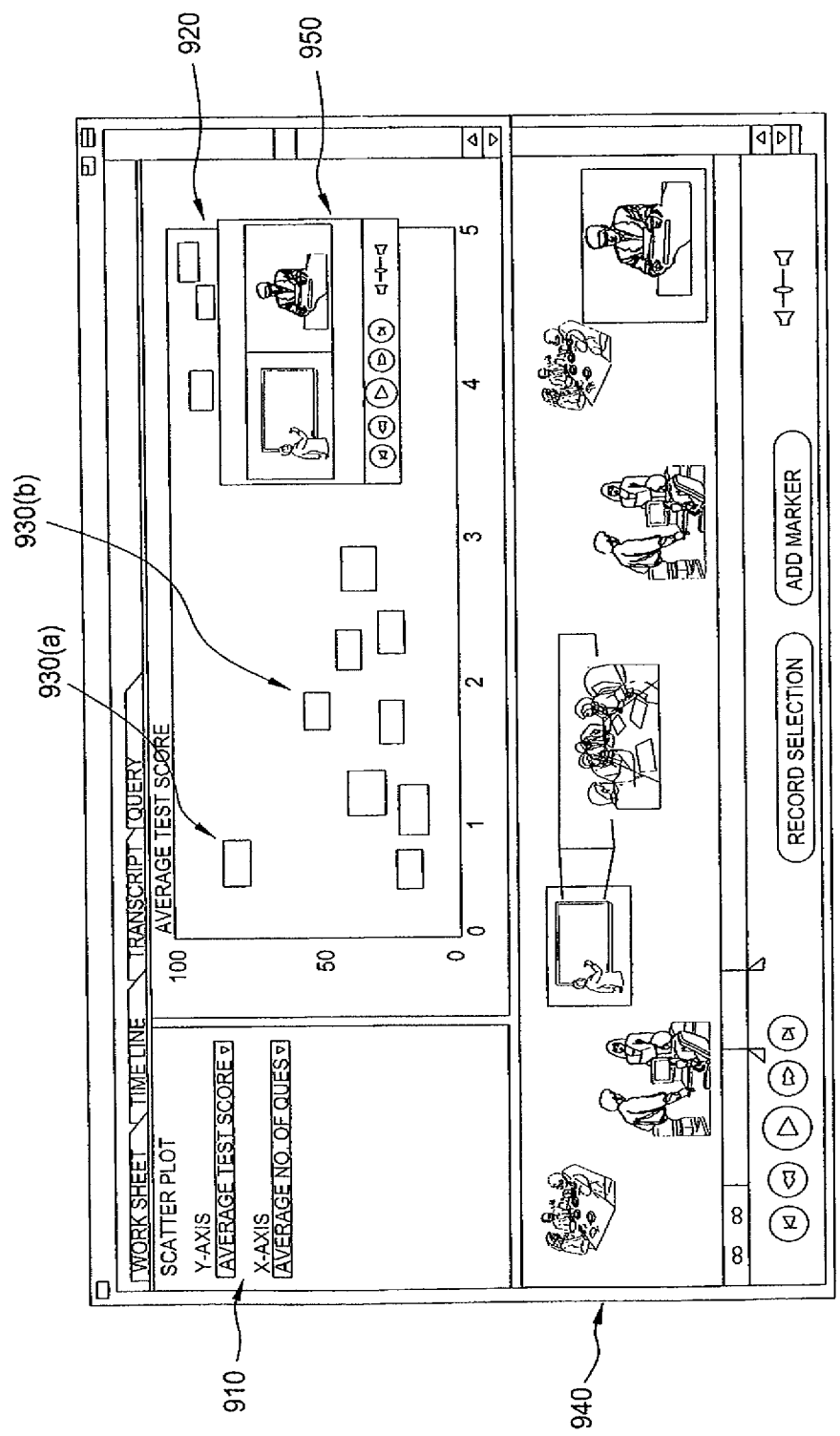
FIG. 9 illustrates a further embodiment of a graphical user interface using data maps to explore and analyze visual data traversals.

In addition, information visualization techniques can help the user discover patterns and relationships in data culled from a panoramic stream. Suppose, for example, that an education researcher interested in studying student-teacher interaction has used DIVER classification code annotations to code a large set of video traversals in terms of such categories as facial expression, hand gestures, frequency of students asking questions, speaking time, and so on. Assume further that the researcher was also able to code each clip in terms of student name, age, gender, average test-score, popularity score, and so on. The interface in FIG. 9 illustrates how dynamic querying techniques can be used to help the researcher explore patterns in the data. FIG. 9 depicts a scatter plot 920 showing the relationship between the average number of questions asked and average test scores. Movie thumbnails 930 are used to mark data points. On the left, the user can choose variables for the x and y axis from pulldown menus 910. In the example, the researcher has chosen to plot average number of questions asked against average test score.

Figure 10:
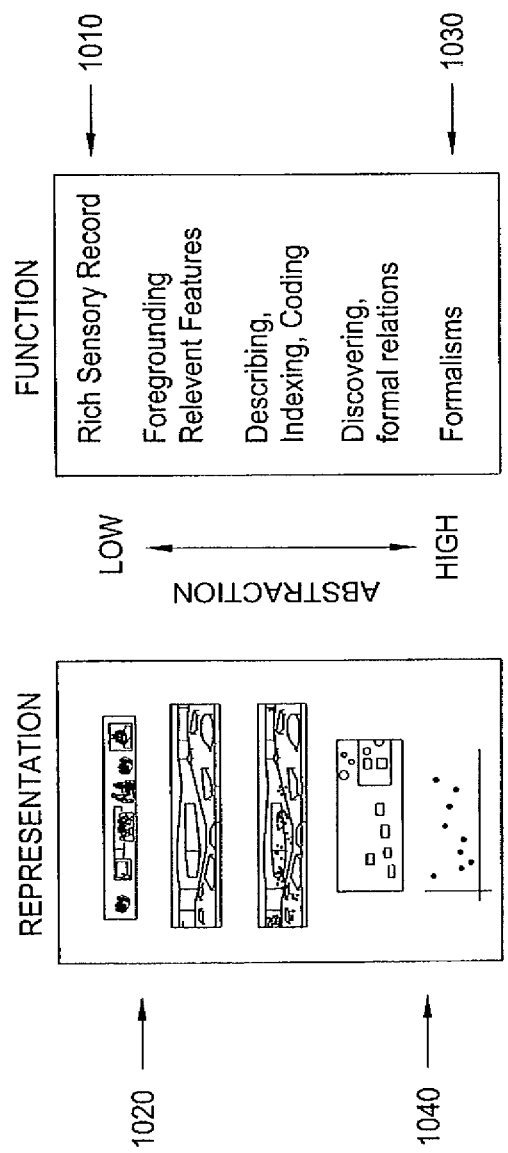
FIG. 10 depicts an information workflow for exploring and analyzing visual data traversals, proceeding from concrete to abstract representation.

The scatter plot helps the researcher see a linear relationship between the frequency with students ask questions and their test scores. The plot also helps the user notice outlier 930(a)—a student whose average score is high, yet does not appear to be asking many questions. The use of movie thumbnails 930 as data points helps the researcher contextualize the data; being able to recognize the outlying data point as representing a specific student might trigger further inquiry. For example, by clicking on the movie thumbnail the researcher could not only play the video traversal represented by this particular data point in detail window 950, but could also see it in its original spatial and temporal context in the panoramic overview 940. In this way, the interface encourages the researcher (as well other others who might be viewing the data) to move quickly up and down the scale of abstraction (as illustrated in FIG. 10), to easily link back to the primary video record in order to examine the fleeting particulars of human behavior in context. Finally, as discussed earlier in connection with FIG. 3, the interface allows even finer levels of analysis by letting the researcher create a set of spatially composited traversals—a new compound movie—allowing her to perform a fine-grained, frame-by-frame analysis, comparing (for instance) traversals of girls asking questions with traversals of boys asking questions.

In general, one can think of the user's analytical tasks as existing along a scale of abstraction, as illustrated in FIG. 10. The scale ranges from direct sensory experience of the event 1010 to more reflective modes of thinking and discovery 1030. And for each level of the scale there will be a corresponding representation (1020, 1040) whose function is to help the user explore the event at a particular level of abstraction. In fact, the power of the concept is precisely its ability to allow the researcher to easily travel in either direction along a scale of abstraction as she dives into the panoramic video record. Thus, in preferred embodiments of the present invention, a panoramic video map is a transformable representation allowing the user to easily shift between levels of abstraction in exploring the panoramic video record.

Figure 6:
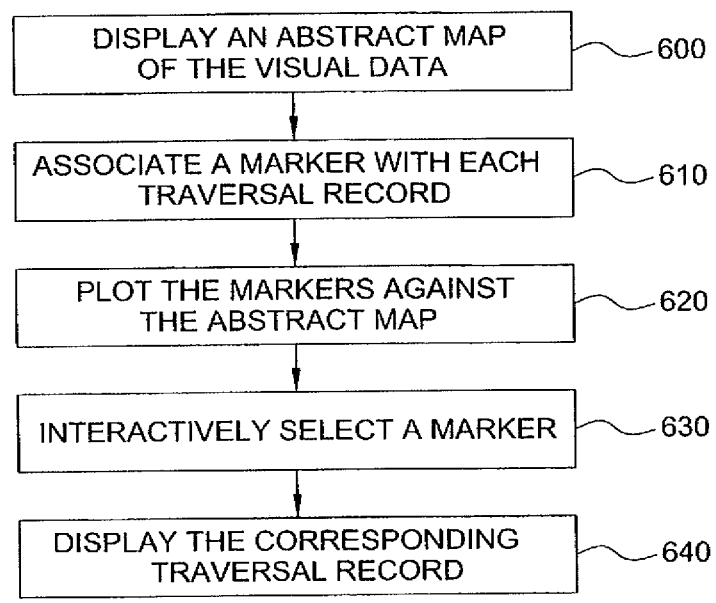
FIG. 6 is a flow diagram illustrating a method for exploring and analyzing visual data traversals using data maps.

FIG. 6 is a flow diagram illustrating a method for exploring and analyzing visual data traversals_using video data maps such as illustrated in FIGS. 7-10. At 600, an abstract map of the visual data being analyzed is displayed. For the scenarios just described, the abstract map would comprise, respectively, a panorama overview 720 (FIG. 7), edge-detected scene 810 (FIG. 8), or scatter plot 920 (FIG. 9). At 610, a marker is associated with each of the traversal records being analyzed. Again, for the scenarios just described, the markers would comprise traversal thumbnail images 730 and 930 (FIGS. 7 and 9) or classification code dots 820 (FIG. 8). At 620, the markers are plotted in appropriate locations along the abstract map. At 630 the user interactively selects the marker of interest and at 640 plays back the corresponding traversal record, thereby linking and shifting between different levels of abstraction in order to explore the video record, as described in FIG. 10.

Scenario 4. Collaborative Visualization of Panoramic Video Events

The scenarios thus far involved a single user analyzing a panoramic video record of behavior. Imagine that a panoramic video of a classroom event was—available as part of a networked community of researchers. Over time, many researchers of different background and points of view could create DIVEs and analyses relating to the panoramic event. A basic mechanism in DIVER for sharing analyses would be to view threaded discussion on a DIVER worksheet that is published on the web, as discussed above in connection with FIG. 5. Panoramic video maps, as discussed in connection with FIGS. 6-10, offer a powerful extension to this idea by allowing the user to see visualizations and data overlays on the scene that would be the aggregate of hundreds or perhaps thousands of users, each with their own perspective on the scene. As will be evident to practitioners in light of the teachings herein, the principles of dynamic querying and information visualization can be applied to allow users to see a family of perspectives as annotation overlays on the scene; for example, a data overlay showing spatio-temporal clustering of the annotations by individual anthropologists coded in a particular color or characteristic shape. Another example would be showing contrastive patterns of spatio-temporal clustering of the annotations of different age groups of children (or those of differential profiles along other measurable dimensions) creating traversals of a motion picture video record accessible through a website.

While the networked community scenario above involved asynchronous DIVEs and analyses relating to imagery, another scenario involves multiple individuals who can be creating DIVEs relating to video or other imagery synchronously, as in a lecture hall or for an entertainment event such as a motion picture.

Figure 11:
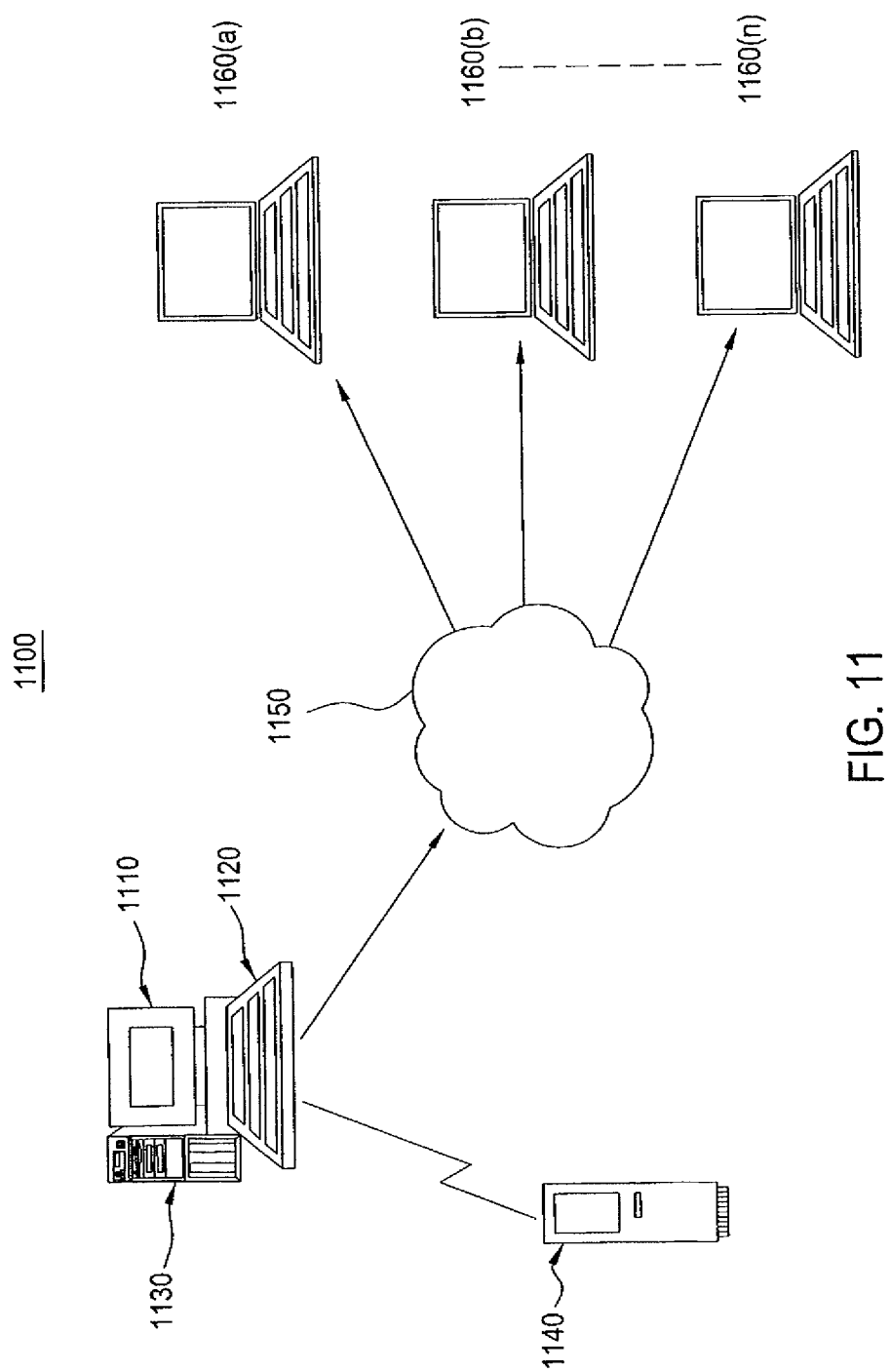
FIG. 11 diagrams a network of digital electronic devices for practicing the preferred embodiments described herein.

FIG. 11 diagrams a network of digital electronic devices for practicing the preferred embodiments described herein. Authoring workstation 1100, a standard personal computer, includes processor and storage 1130, display 1110 and input 1120, and is used to practice the authoring method of FIG. 1 and generate the graphical interface displays of FIGS. 2-4.

In a variation, remote control device 1140 is preferably wirelessly connected to workstation 1100, enabling convenient handheld control of the interactive sessions. In some embodiments, device 1140 may include sufficient processing power and storage to fully control the logic and generate the interactive displays of FIGS. 1-4, in which case device 1100 can in principle be an electronic display and may not necessarily require independent computational processing power 1130.

In any case, devices 1130/1140 are preferably connected via network 1150 (e.g., Internet or private intranet) with user devices 1160(a)-(n), which preferably include standard web-browsing client capabilities. Publishing and sharing annotated traversals per FIG. 5 is performed by this community of networked devices. Analysis of traversals using abstract video maps, as per FIGS. 6-10, can be performed independently by any of devices 1130/1140 or 1160(a)-(n) that is equipped with sufficient processing power and storage to run mapping and plotting software routines implementing the functionality described and discussed in connection with said figures.

The scope of the invention should be determined not by the embodiments illustrated, but by the appended claims and their legal equivalents.

What is claimed is:

1. An interactive, electronic method of authoring annotated traversals through visual data, the method comprising: displaying the visual data;

interactively defining a traversal of the displayed visual data by positioning a resizable overlay window relative to the displayed visual data, wherein said resizable overlay window is resizable while the visual data is being displayed, said traversal comprising a subset of motion video that specifies a time-based sequence of frames of said motion video, each of said frames comprising the visual data delineated by the overlay window, wherein the displaying said visual data comprises displaying the visual data in a cylindrical layout, and wherein said positioning of the overlay window is defined by a field of view of a virtual camera located centrally to said cylindrical layout;

annotating the traversal; and storing a persistent record of the annotated traversal.

2. The method of claim 1, wherein the panoramic video imagery is captured using a plurality of cameras facing inward from a perimeter of a scene, and wherein said traversal reflects a user-adjusted 3D-perspective.

3. The method of claim 1, wherein the defining the traversal further comprises panning the visual data by positioning the overlay window relative to the displayed visual data, and interactively zooming by resizing the overlay window.

4. The method of claim 1, wherein the positioning said overlay window comprises moving said visual data, while said overlay window is fixed.

5. The method of claim 1, wherein the positioning said overlay window comprises moving said overlay window, while said displayed visual data is fixed.

6. The method of claim 1, wherein said overlay window has a geometric shape that is user-selectable.

7. The method of claim 1, further comprising concurrently defining a plurality of traversals by using a plurality of independently-positioned overlay windows.

8. The method of claim 1, wherein the annotating includes, at least in part, data selected from one or more of the following categories: textual comments, graphical symbols, classification codes, meta-data, and an audio transcription.

9. The method of claim 8, wherein the classification codes are interactively selected from user-definable code templates.

10. The method of claim 1, wherein the stored traversal record comprises a compressed portion of said visual data.

11. The method of claim 1, wherein the stored traversal record comprises a set of location coordinates defining said traversals.

12. The method of claim 1, wherein the detail region displays data at a higher magnification or resolution, and wherein said higher magnification or resolution is based at least partly on one or more factors selected from a group comprising: a user request, a network bandwidth, a network condition.

13. The method of claim 1, further comprising initiating playback of a selected stored record in the detail region, at least in part, by interactively selecting a desired one of the listed traversal records.

14. The method of claim 13, wherein said interactively selecting a desired traversal record comprises dragging and dropping a graphical element corresponding to the selected record from the worksheet region onto the detail region.

15. The method of claim 1, further comprising specifying a compound traversal record, being a combination of a plurality of the stored traversal records.

16. The method of claim 15, further comprising playing back the compound traversal record by adjacently displaying the contents of each of the plurality of traversal records.

17. The method of claim 15, further comprising specifying an audio contribution from each of the plurality of traversal records.

18. An interactive, electronic apparatus for authoring annotated traversals through visual data, the apparatus comprising:
- means for displaying the visual data;
- means for interactively defining a traversal of the displayed visual data by positioning a resizable overlay window relative to the displayed visual data, wherein said resizable overlay window is resizable while the visual data is being displayed, said traversal comprising a subset of motion video that specifies a time-based sequence of frames of said motion video, each of said frames comprising the visual data delineated by the overlay window, wherein the means for displaying said visual data displays the visual data in a cylindrical layout, and wherein said positioning of the overlay window is defined by a field of view of a virtual camera located centrally to said cylindrical layout;
- means for annotating the traversal; and
- means for storing a persistent record of the annotated traversal.

19. A digital electronic apparatus for interactively authoring annotated traversals through visual data, the apparatus comprising

- a first display device for displaying the visual data; and
- a handheld, remote control device in communication with the first display device and configured to control a graphical interaction on the first display device comprising the following operations:

defining a traversal of the displayed visual data, said traversal comprising a subset of motion video that specifies a time-based sequence of frames of said motion video, each of said frames comprising a spatial subset of the visual data, wherein defining a traversal comprises panning the visual data by positioning said resizable overlay window relative to the displayed visual data, wherein said resizable overlay window is resizable while the visual data is being displayed, and zooming the visual data by resizing the overlay window, wherein the displayed visual data comprises displaying the displayed visual data in a cylindrical layout, and wherein said positioning of the resizable overlay window is defined by a field of view of a virtual camera located centrally to said cylindrical layout;

annotating said traversal; and storing a persistent record of the annotated traversal.

* * * * *